United States Patent
Katz

(10) Patent No.: US 10,764,556 B2
(45) Date of Patent: Sep. 1, 2020

(54) DEPTH SCULPTURING OF THREE-DIMENSIONAL DEPTH IMAGES UTILIZING TWO-DIMENSIONAL INPUT SELECTION

(71) Applicant: Snap Inc., Santa Monica, CA (US)

(72) Inventor: Sagi Katz, Yokneam Ilit (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/561,127

(22) Filed: Sep. 5, 2019

(65) Prior Publication Data

US 2020/0099912 A1 Mar. 26, 2020

Related U.S. Application Data

(60) Provisional application No. 62/736,658, filed on Sep. 26, 2018.

(51) Int. Cl.

| | |
|---|---|
| *H04N 7/18* | (2006.01) |
| *H04N 13/122* | (2018.01) |
| *G06T 19/20* | (2011.01) |
| *H04N 13/128* | (2018.01) |
| *H04N 13/344* | (2018.01) |

(Continued)

(52) U.S. Cl.
CPC ....... *H04N 13/122* (2018.05); *G02B 27/0172* (2013.01); *G02B 27/0176* (2013.01); *G06T 7/593* (2017.01); *G06T 15/205* (2013.01); *G06T 19/20* (2013.01); *H04N 13/128* (2018.05); *H04N 13/344* (2018.05); *H04N 13/383* (2018.05);

(Continued)

(58) Field of Classification Search
CPC .................................................. H04N 13/122

USPC .......................................................... 348/51
See application file for complete search history.

(56) References Cited

U.S. PATENT DOCUMENTS

| | | | | |
|---|---|---|---|---|
| 6,307,526 | B1 * | 10/2001 | Mann | G02B 27/017 345/7 |
| 6,515,659 | B1 * | 2/2003 | Kaye | G06T 17/20 345/419 |

(Continued)

FOREIGN PATENT DOCUMENTS

KR 1020140104917 A 8/2014

OTHER PUBLICATIONS

International Search Report and Written Opinion for International Application No. PCT/US2019/049637, dated Dec. 23, 2019 (dated Dec. 23, 2019)—11 pages.

*Primary Examiner* — Leron Beck
(74) *Attorney, Agent, or Firm* — Culhane Meadows PLLC; Stephen J. Weed

(57) ABSTRACT

A depth sculpturing system comprises an eyewear device that includes a frame, a temple connected to a lateral side of the frame, and a depth-capturing camera. The depth sculpturing system further includes a user input device. Execution of programming by a processor configures the depth sculpturing system to perform functions to track, via the user input device, motion of a two-dimensional input selection from an initial touch point to a final touch point. The depth sculpturing system determines a rotation matrix between an initial ray and a final ray that project to the initial touch point and the final touch point, correspondingly. The depth sculpturing system generates a depth sculptured image by applying the rotation matrix to vertices of an initial depth image. The depth sculpturing system presents, via an image display, the depth sculptured image.

20 Claims, 26 Drawing Sheets

(51) Int. Cl.
*H04N 13/383* (2018.01)
*G06T 7/593* (2017.01)
*G02B 27/01* (2006.01)
*G06T 15/20* (2011.01)
*H04N 13/388* (2018.01)

(52) U.S. Cl.
CPC ... *H04N 13/388* (2018.05); *G02B 2027/0178* (2013.01)

(56) References Cited

U.S. PATENT DOCUMENTS

| | | | | |
|---|---|---|---|---|
| 7,624,436 | B2* | 11/2009 | Balakrishnan | H04L 63/0245 726/11 |
| 7,952,595 | B2* | 5/2011 | Schiwietz | G06T 3/0093 345/619 |
| 8,515,172 | B2* | 8/2013 | Varekamp | G06T 7/136 382/173 |
| 8,654,181 | B2* | 2/2014 | Cornog | H04N 13/128 348/47 |
| 8,998,414 | B2* | 4/2015 | Bohn | G02B 5/20 351/210 |
| 9,146,629 | B2* | 9/2015 | Kim | G06F 3/04815 |
| 9,984,178 | B2 | 5/2018 | Kuwahara | |
| 10,043,430 | B1* | 8/2018 | D'Amico | G09G 3/006 |
| 10,078,917 | B1 | 9/2018 | Gaeta et al. | |
| 10,509,466 | B1* | 12/2019 | Miller | G06K 9/52 |
| 2010/0054579 | A1* | 3/2010 | Okutomi | G01C 11/06 382/154 |
| 2010/0098326 | A1* | 4/2010 | Abeloe | H04N 21/235 382/154 |
| 2010/0245356 | A1* | 9/2010 | Gateau | H04N 13/279 345/427 |
| 2011/0227914 | A1* | 9/2011 | Varekamp | G06T 7/50 345/419 |
| 2012/0154277 | A1* | 6/2012 | Bar-Zeev | G02B 27/017 345/158 |
| 2012/0206452 | A1* | 8/2012 | Geisner | G02B 27/017 345/419 |
| 2012/0212398 | A1* | 8/2012 | Border | G06F 3/017 345/8 |
| 2012/0229450 | A1 | 9/2012 | Kim et al. | |
| 2013/0002813 | A1* | 1/2013 | Vaught | H04N 13/383 348/43 |
| 2013/0016033 | A1* | 1/2013 | Latta | G06F 3/011 345/8 |
| 2013/0250058 | A1* | 9/2013 | De Haan | H04N 13/128 348/43 |
| 2013/0286160 | A1* | 10/2013 | Sasaki | H04N 21/816 348/43 |
| 2014/0006026 | A1 | 1/2014 | Lamb et al. | |
| 2015/0358612 | A1* | 12/2015 | Sandrew | H04N 5/23238 348/36 |
| 2017/0134717 | A1 | 5/2017 | Trail et al. | |
| 2018/0075653 | A1* | 3/2018 | Schillings | G06F 3/041 |

* cited by examiner

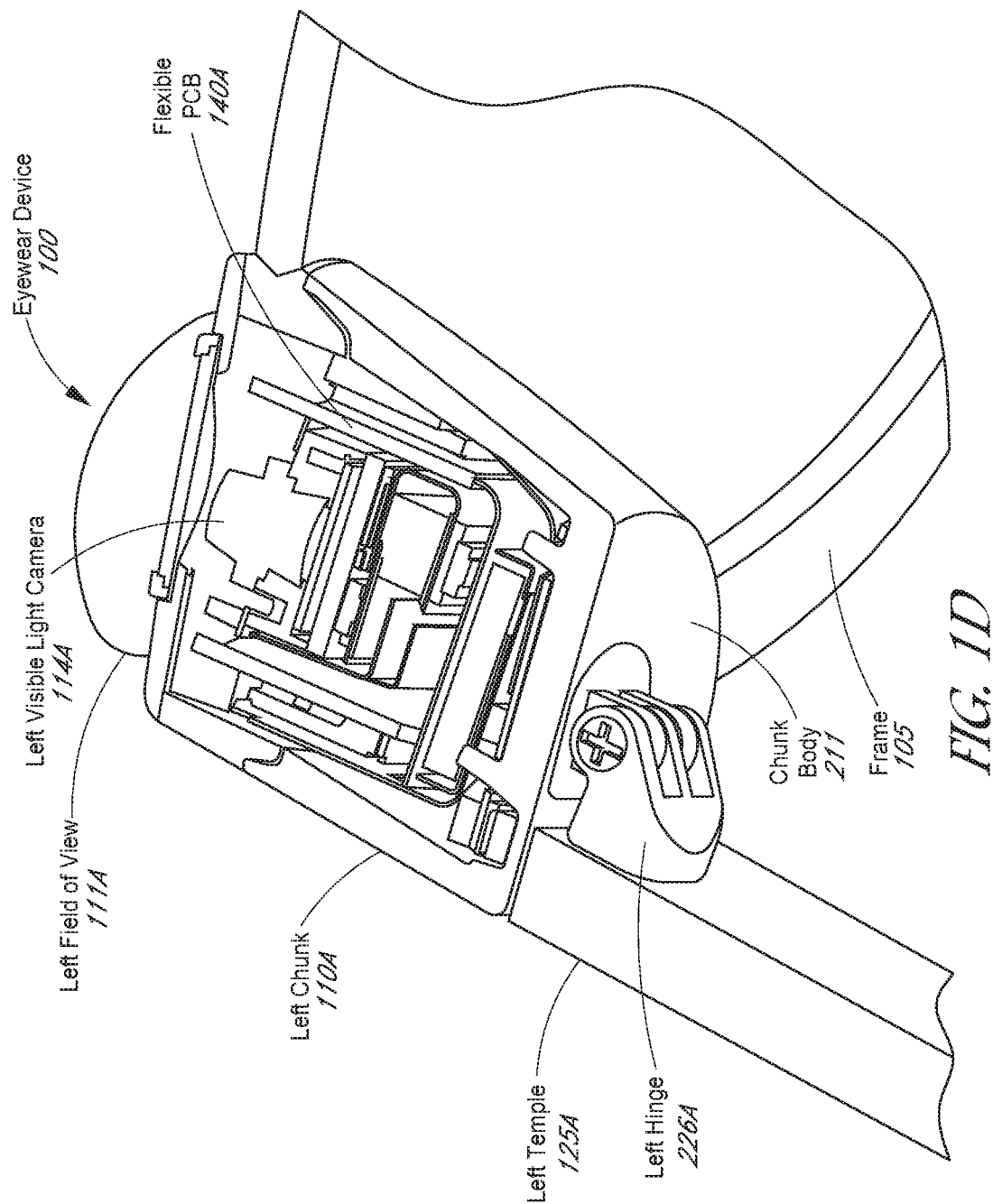

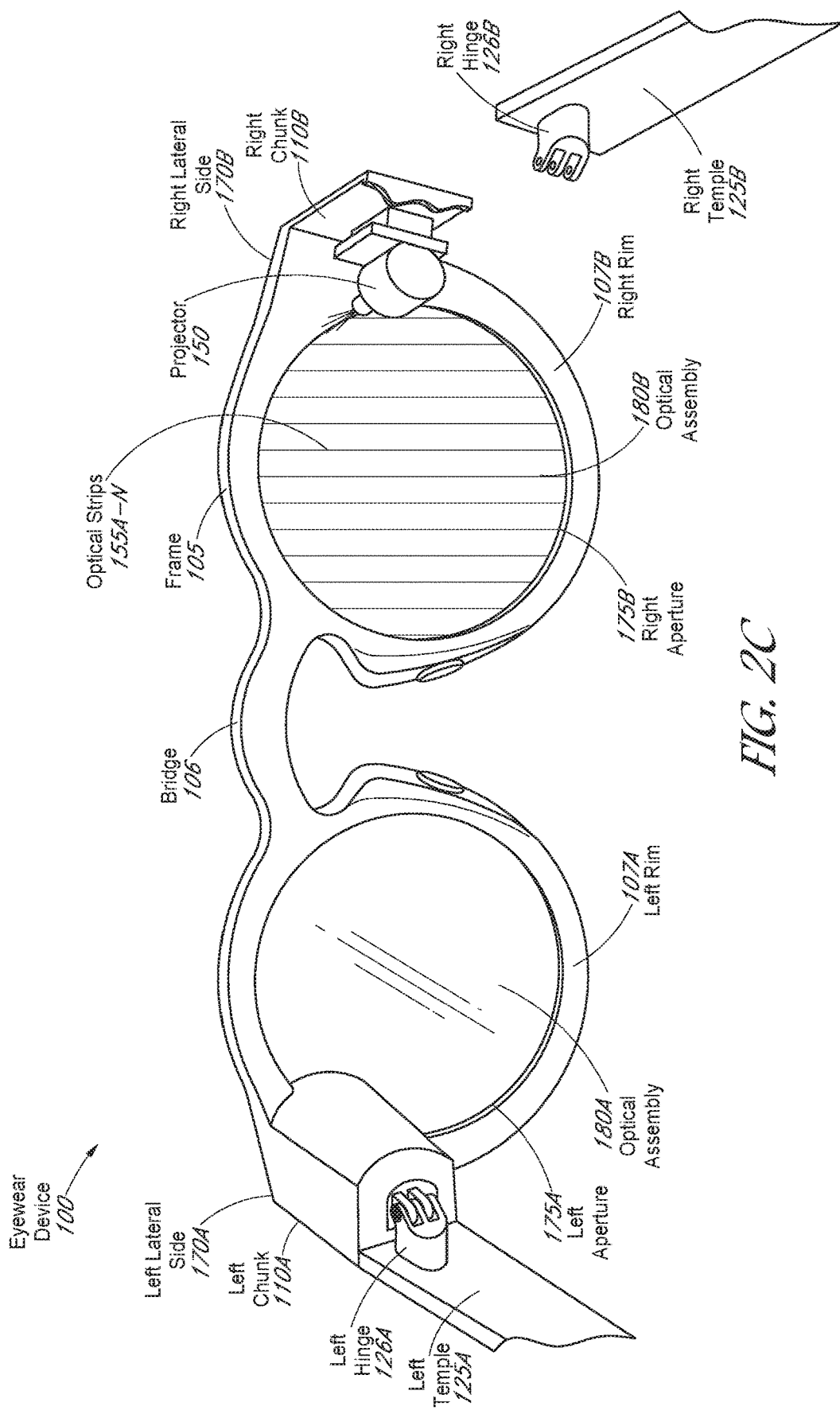

DEPTH SCULPTURING OF THREE-DIMENSIONAL DEPTH IMAGES UTILIZING TWO-DIMENSIONAL INPUT SELECTION

CROSS-REFERENCE TO RELATED APPLICATIONS

This application claims priority to U.S. Provisional Application Ser. No. 62/736,658 entitled Depth Sculpturing of Three-Dimensional Depth Images Utilizing Two-Dimensional Input Selection, filed on Sep. 26, 2018, the contents of which are incorporated fully herein by reference.

TECHNICAL FIELD

The present subject matter relates to wearable devices, e.g., eyewear devices, and mobile devices and techniques to allow a user to change three-dimensional space using a two-dimensional input.

BACKGROUND

Computing devices, such as wearable devices, including portable eyewear devices (e.g., smartglasses, headwear, and headgear); mobile devices (e.g., tablets, smartphones, and laptops); and personal computers available today integrate image displays and cameras. Viewing, manipulating, and interacting with the displayed three-dimensional (3D) image content (e.g., videos, pictures, etc.) on the computing device can be difficult utilizing two-dimensional (2D) input, such as utilizing a touch screen device, a stylus, or a computer mouse. For example, manipulating three-dimensional images in two-dimensional space is difficult to incorporate into computing devices.

A graphical user interface (GUI) is a type of user interface that allows users to navigate the computing device through graphical icons and visual indicators such as secondary notation, instead of a text-based user interface. Navigating the displayed three-dimensional GUI content on the image display is cumbersome utilizing the two-dimensional input.

Viewing three-dimensional space on a computing device requires many mouse clicks and selections with a computer mouse. Accordingly, a need exists to simplify user interactions with three-dimensional images utilizing two-dimensional user input.

BRIEF DESCRIPTION OF THE DRAWINGS

The drawing figures depict one or more implementations, by way of example only, not by way of limitations. In the figures, like reference numerals refer to the same or similar elements.

FIG. 1D is a top cross-sectional view of a left chunk of the eyewear device of FIG. 1C depicting the left visible light camera of the depth-capturing camera, and the circuit board.

FIGS. 2B and 2C are rear views of example hardware configurations of the eyewear device, including two different types of image displays.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a depth-capturing camera such as shown in any of the drawings, are given by way of example only, for illustration and discussion purposes. In operation for depth sculpturing, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any depth-capturing camera or component of the depth-capturing camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1A:
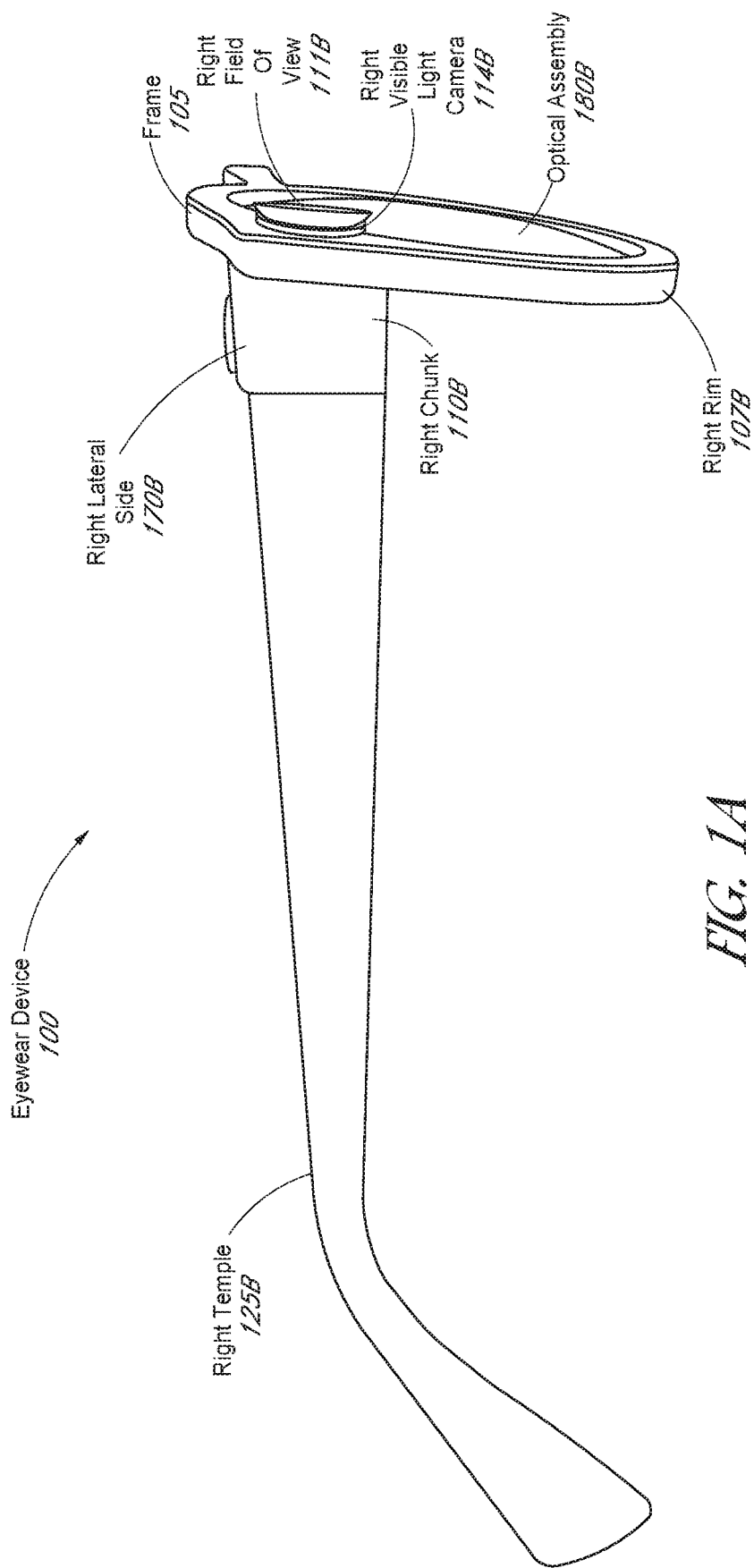
FIG. 1A is a right side view of an example hardware configuration of an eyewear device utilized in a depth sculpturing system, in which a two-dimensional input selection from a user is applied to an initial depth image to generate a depth sculptured image.

FIG. 1A is a right side view of an example hardware configuration of an eyewear device 100 utilized in a depth sculpturing system, which shows a right visible light camera 114B of a depth-capturing camera to generate an initial depth image. As further described below, in the depth sculpturing system, a two-dimensional input selection from a user is applied to an initial depth image to generate a depth sculptured image.

Figure 1B:
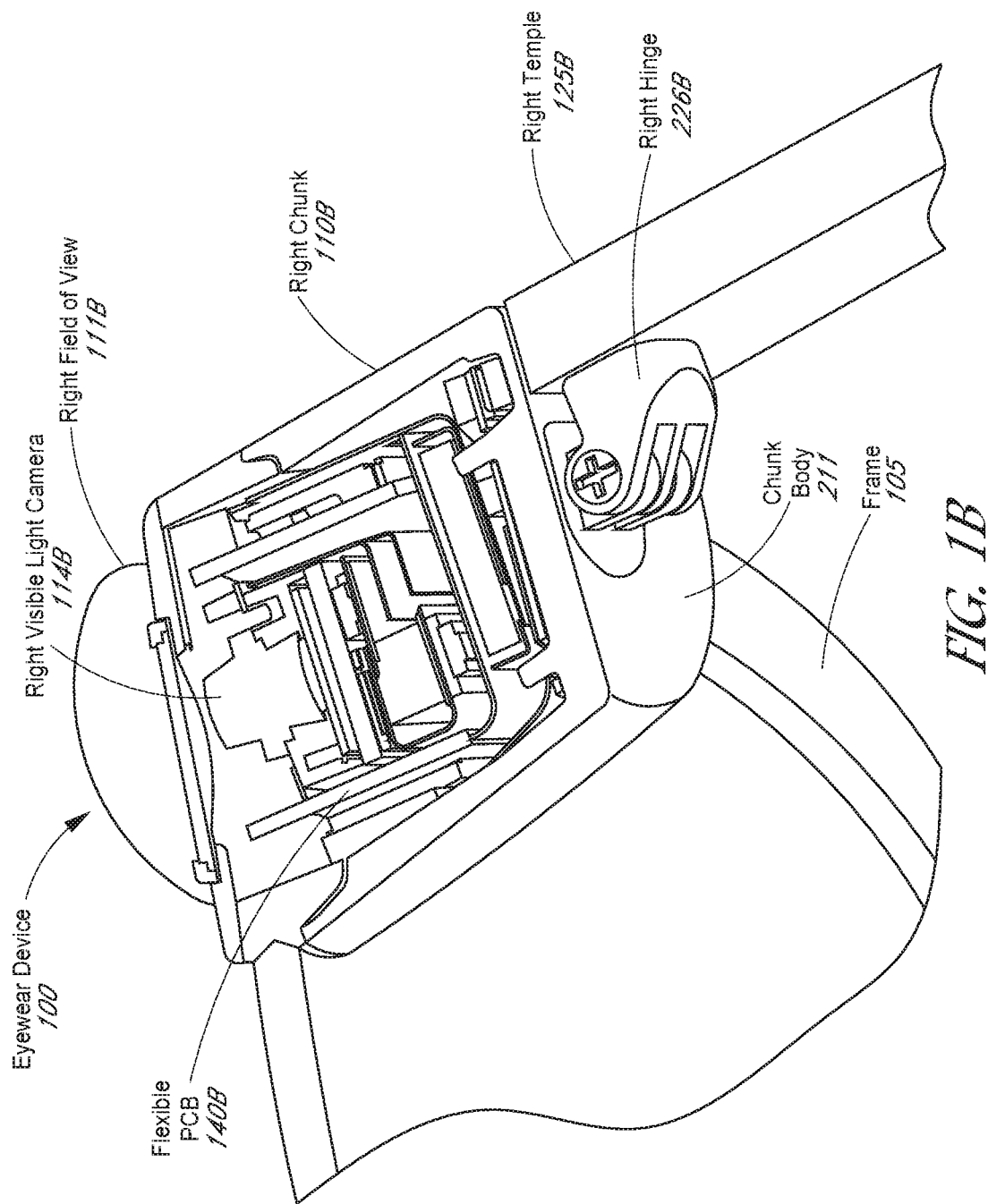
FIG. 1B is a top cross-sectional view of a right chunk of the eyewear device of FIG. 1A depicting a right visible light camera of a depth-capturing camera, and a circuit board.
Figure 1C:
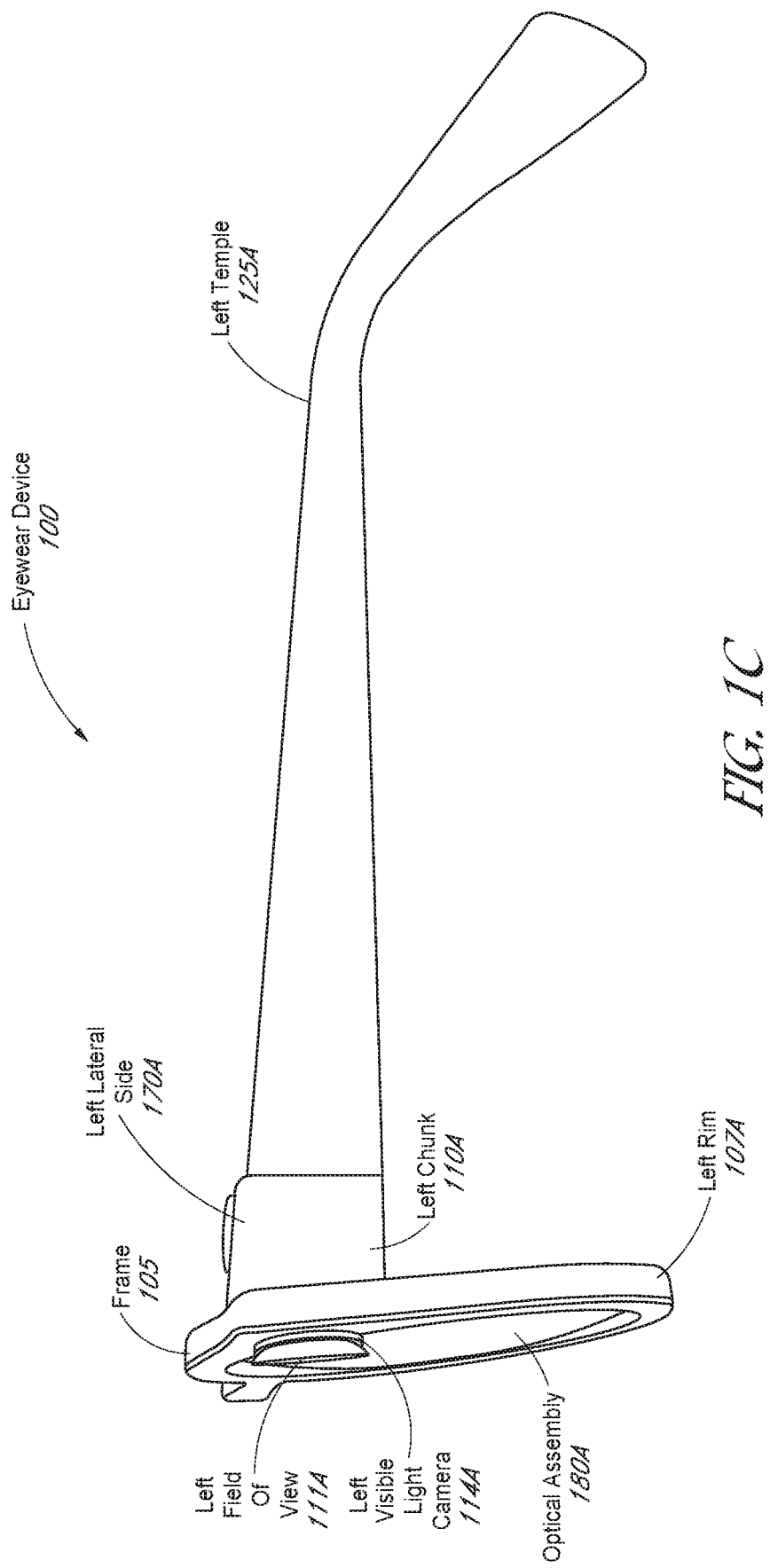
FIG. 1C is a left side view of an example hardware configuration of an eyewear device of FIG. 1A, which shows a left visible light camera of the depth-capturing camera.

Eyewear device 100, includes a right optical assembly 180B with an image display to present images, such as depth images and depth sculptured images. As shown in FIGS. 1A-B, the eyewear device 100 includes the right visible light camera 114B. Eyewear device 100 can include multiple visible light cameras 114A-B that form a passive type of depth-capturing camera, such as stereo camera, of which the right visible light camera 114B is located on a right chunk 110B. As shown in FIGS. 1C-D, the eyewear device 100 can also include a left visible light camera 114A. Alternatively, in the example of FIG. 2A, the depth-capturing camera can be an active type of depth-capturing camera that includes a single visible light camera 114B and a depth sensor (see element 213 of FIG. 2A).

Left and right visible light cameras 114A-B are sensitive to the visible light range wavelength. Each of the visible light cameras 114A-B have a different frontward facing field of view which are overlapping to allow three-dimensional depth images to be generated, for example, right visible light camera 114B has the depicted right field of view 111B. Generally, a "field of view" is the part of the scene that is visible through the camera at a particular position and orientation in space. Objects or object features outside the field of view 111A-B when the image is captured by the visible light camera are not recorded in a raw image (e.g., photograph or picture). The field of view describes an angle range or extent which the image sensor of the visible light camera 114A-B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A-B have a field of view with an angle of view between 15° to 30°, for example 24°, and have a resolution of 480×480 pixels. The "angle of coverage" describes the angle range that a lens of visible light cameras 114A-B or infrared camera 220 (see FIG. 2A) can effectively image. Typically, the image circle produced by a camera lens is large enough to cover the film or sensor completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. As used herein, the term "overlapping" when referring to field of view means the matrix of pixels in the generated raw image(s) or infrared image of a scene overlap by 30% or more. As used herein, the term "substantially overlapping" when referring to field of view means the matrix of pixels in the generated raw image(s) or infrared image of a scene overlap by 50% or more.

Image sensor data from the visible light cameras 114A-B are captured along with geolocation data, digitized by an image processor, and stored in a memory. The captured left and right raw images captured by respective visible light cameras 114A-B are in the two-dimensional space domain and comprise a matrix of pixels on a two-dimensional coordinate system that includes an X axis for horizontal position and a Y axis for vertical position. Each pixel includes a color attribute (e.g., a red pixel light value, a green pixel light value, and/or a blue pixel light value); and a position attribute (e.g., an X location coordinate and a Y location coordinate).

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light cameras 114A-B and process those signals from the visible light camera 114 into a format suitable for storage in the memory. The timestamp can be added by the image processor or other processor, which controls operation of the visible light cameras 114A-B. Visible light cameras 114A-B allow the depth-capturing camera to simulate human binocular vision. Depth-capturing camera provides the ability to reproduce three-dimensional images based on two captured images from the visible light cameras 114A-B having the same timestamp. Such three-dimensional images allow for an immersive life-like experience, e.g., for virtual reality or video gaming.

For stereoscopic vision, a pair of raw red, green, and blue (RGB) images are captured of a scene at a given moment in time—one image for each of the left and right visible light cameras 114A-B. When the pair of captured raw images from the frontward facing left and right field of views 111A-B of the left and right visible light cameras 114A-B are processed (e.g., by the image processor), depth images are generated, and the generated depth images can be perceived by a user on the optical assembly 180A-B or other image display(s) (e.g., of a mobile device). The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex includes a position attribute (e.g., a red pixel light value, a green pixel light value, and/or a blue pixel light value); a position attribute (e.g., an X location coordinate, a Y location coordinate, and a Z location coordinate); a texture attribute, and/or a reflectance attribute. The texture attribute quantifies the perceived texture of the depth image, such as the spatial arrangement of color or intensities in a region of vertices of the depth image.

Generally, perception of depth arises from the disparity of a given 3D point in the left and right raw images captured by visible light cameras 114A-B. Disparity is the difference in image location of the same 3D point when projected under perspective of the visible light cameras 114A-B ($d=x_{left} - x_{right}$). For visible light cameras 114A-B with parallel optical axes, focal length f, baseline b, and corresponding image points ($x_{left}$, $y_{left}$) and ($x_{right}$, $y_{right}$), the location of a 3D point (Z axis location coordinate) can be derived utilizing triangulation which determines depth from disparity. Typically, depth of the 3D point is inversely proportional to disparity. A variety of other techniques can also be used. Generation of three-dimensional depth images and depth sculpturing images is explained in more detail later.

In an example, a depth sculpturing system includes the eyewear device 100. The eyewear device 100 includes a frame 105 and a left temple 110A extending from a left lateral side 170A of the frame 105 and a right temple 110B extending from a right lateral side 170B of the frame 105. Eyewear device 100 further includes a depth-capturing camera. The depth-capturing camera includes: (i) at least two visible light cameras with overlapping fields of view; or (ii) a least one visible light camera 114A-B and a depth sensor (element 213 of FIG. 2A). In one example, the depth-capturing camera includes a left visible light camera 114A with a left field of view 111A connected to the frame 105 or the left temple 110A to capture a left image of the scene. Eyewear device 100 further includes a right visible light camera 114B connected to the frame 105 or the right temple 110B with a right field of view 111B to capture (e.g., simultaneously with the left visible light camera 114A) a right image of the scene which partially overlaps the left image.

Depth sculpturing system further includes a computing device, such as a host computer (e.g., mobile device 990 of FIGS. 9-10) coupled to eyewear device 100 over a network. The depth sculpturing system, further includes an image display (optical assembly 180A-B of eyewear device; image display 1080 of mobile device 990 of FIG. 10) for presenting (e.g., displaying) a sequence of images. The sequence of images includes the initial images, which can be raw images or processed raw images in two-dimensional space (e.g., after rectification) and the depth sculptured image. Depth sculpturing system further includes an image display driver (element 942 of eyewear device 100 of FIG. 9; element 1090 of mobile device 990 of FIG. 10) coupled to the image display (optical assembly 180A-B of eyewear device; image display 1080 of mobile device 990 of FIG. 10) to control the image display to present the sequence of images, including the initial images and depth sculptured images.

Depth sculpturing system further includes a user input device to receive a two-dimensional input selection from a user. Examples of user input devices include a touch sensor (element 991 of FIG. 9 for the eyewear device 100), a touch screen display (element 1091 of FIG. 10 for the mobile device 1090), and a computer mouse for a personal computer or a laptop computer. Depth sculpturing system further includes a processor (element 932 of eyewear device 100 of FIG. 9; element 1030 of mobile device 990 of FIG. 10) coupled to the eyewear device 100 and the depth-capturing camera. Depth sculpturing system further includes a memory (element 934 of eyewear device 100 of FIG. 9; elements 1040A-B of mobile device 990 of FIG. 10) accessible to the processor, and depth sculpturing programming in the memory (element 945 of eyewear device 100 of FIG. 9; element 945 of mobile device 990 of FIG. 10), for example in the eyewear device 100 itself, mobile device (element 990 of FIG. 9), or another part of the depth sculpturing system (e.g., server system 998 of FIG. 9). Execution of the programming (element 945 of FIG. 9) by the processor (element 932 of FIG. 9) configures the eyewear device 100 to generate, via the depth-capturing camera, the initial depth image corresponding to the initial image. The initial depth image is formed of a matrix of vertices. Each vertex represents a pixel in a three-dimensional scene. Each vertex has a position attribute. The position attribute of each vertex is based on a three-dimensional location coordinate system and includes an X location coordinate on an X axis for horizontal position, a Y location coordinate on a Y axis for vertical position, and a Z location coordinate on a Z axis for depth.

Execution of the depth sculpturing programming (element 945 of FIG. 10) by the processor (element 1030 of FIG. 10) configures the mobile device (element 990 of FIG. 10) of the depth sculpturing system to perform the following functions. Mobile device (element 990 of FIG. 10) presents, via the image display (element 1080 of FIG. 10), the initial image. Mobile device (element 990 of FIG. 10) receives, via the user input device (element 1091 of FIG. 10), the two-dimensional input selection of the presented initial image from the user. Mobile device (element 990 of FIG. 10) tracks, via the user input device (element 1091 of FIG. 10), motion of the two-dimensional input selection from an initial touch point to a final touch point of the presented initial image. Mobile device (element 990 of FIG. 10) computes an initial ray that is a projection from an origin vertex of the three-dimensional location coordinate system to an initial vertex corresponding to the initial touch point of the presented initial image. The origin vertex corresponds to the depth-capturing camera. Mobile device (element 990 of FIG. 10) computes a final ray that is the projection from the initial touch point to a final vertex corresponding to the final touch point of the presented initial image. Mobile device (element 990 of FIG. 10) determines a rotation matrix between the initial ray and the final ray that describes rotation from the initial ray to the final ray to derive a depth sculpturing region. Mobile device (element 990 of FIG. 10) generates a depth sculptured image by applying the rotation matrix to the position attribute of the vertices of the initial depth image in the depth sculpturing region. Mobile device (element 990 of FIG. 10) presents, via the image display (image display 1080 of FIG. 10), the depth sculptured image. Various depth sculpturing programming (element 945 of FIGS. 9-10) functions described herein may be implemented within other parts of the depth sculpturing system, such as the eyewear device 100 or another host computer besides mobile device (element 990 of FIG. 10), such as a server system (element 998 of FIG. 9).

In some examples, the two-dimensional input selection generates a depth sculpturing photo filter effect, which is applied as the rotation matrix to the initial depth image in response to finger swiping across a touch screen display (e.g., combined image display 1080 and user input device 1091). To obtain the depth sculpturing effect, an initial touch point (e.g., first touch point) and a final touch point (e.g., last touch point), which represent drag, are derived. A three-dimensional ray is determined for each touch point. In the depth image model, each selected two-dimensional space touch point corresponds to an X, Y, Z coordinate, so each touch point can be mapped to a real three-dimensional vertex in the initial depth image. A ray can be a three-dimensional normalized vector that has a unit length and a direction. Each of the two rays (initial ray and final ray) from the respective initial touch point and the final touch point have a length which is known since the depth of the vertices (Z coordinate is known). The initial ray shoots a ray from the origin of the depth-capturing camera in the initial depth image to the initial touch point and the final rays shoots a ray from the initial touch point to the final touch point. The rotation between the initial ray and the final ray is then computed and a rotation matrix is obtained. This rotation matrix is then applied to the three-dimensional pixels (i.e., vertices), which are depth sculpted by being moved in three-dimensional space, which appears as a warping effect, based on the transformation. The depth sculptured image with the depth sculpturing photo filter effect may then be shared with friends via a chat application executing on the mobile device (element 990 of FIG. 10) by transmission over a network.

FIG. 1B is a top cross-sectional view of a right chunk 110B of the eyewear device 100 of FIG. 1A depicting the right visible light camera 114B of the depth-capturing camera, and a circuit board. FIG. 1C is a left side view of an example hardware configuration of an eyewear device 100 of FIG. 1A, which shows a left visible light camera 114A of the depth-capturing camera. FIG. 1D is a top cross-sectional view of a left chunk 110A of the eyewear device of FIG. 1C depicting the left visible light camera 114A of the depth-capturing camera, and a circuit board. Construction and placement of the left visible light camera 114A is substantially similar to the right visible light camera 114B, except the connections and coupling are on the left lateral side 170A. As shown in the example of FIG. 1B, the eyewear device 100 includes the right visible light camera 114B and a circuit board, which may be a flexible printed circuit board (PCB) 140B. The right hinge 226B connects the right chunk 110B to a right temple 125B of the eyewear device 100. In some examples, components of the right visible light camera 114B, the flexible PCB 140B, or other electrical connectors or contacts may be located on the right temple 125B or the right hinge 226B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible light camera 114B, microphone(s), low-power wireless circuitry (e.g., for wireless short range network communication via Bluetooth™), high-speed wireless circuitry (e.g., for wireless local area network communication via WiFi).

The right visible light camera 114B is coupled to or disposed on the flexible PCB 240 and covered by a visible light camera cover lens, which is aimed through opening(s) formed in the frame 105. For example, the right rim 107B of the frame 105 is connected to the right chunk 110B and includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outwards facing field of view 111B with a line of sight or perspective of the right eye of the user of the eyewear device 100. The visible light camera cover lens can also be adhered to an outwards facing surface of the right chunk 110B in which an opening is formed with an outwards facing angle of coverage, but in a different outwards direction. The coupling can also be indirect via intervening components.

Left (first) visible light camera 114A is connected to a left image display of left optical assembly 180A to capture a left eye viewed scene observed by a wearer of the eyewear device 100 in a left raw image. Right (second) visible light camera 114B is connected to a right image display of right optical assembly 180B to captured a right eye viewed scene observed by the wearer of the eyewear device 100 in a right raw image. The left raw image and the right raw image partially overlap to present a three-dimensional observable space of a generated depth image.

Flexible PCB 140B is disposed inside the right chunk 110B and is coupled to one or more other components housed in the right chunk 110B. Although shown as being formed on the circuit boards of the right chunk 110B, the right visible light camera 114B can be formed on the circuit boards of the left chunk 110A, the temples 125A-B, or frame 105.

Figure 2A:
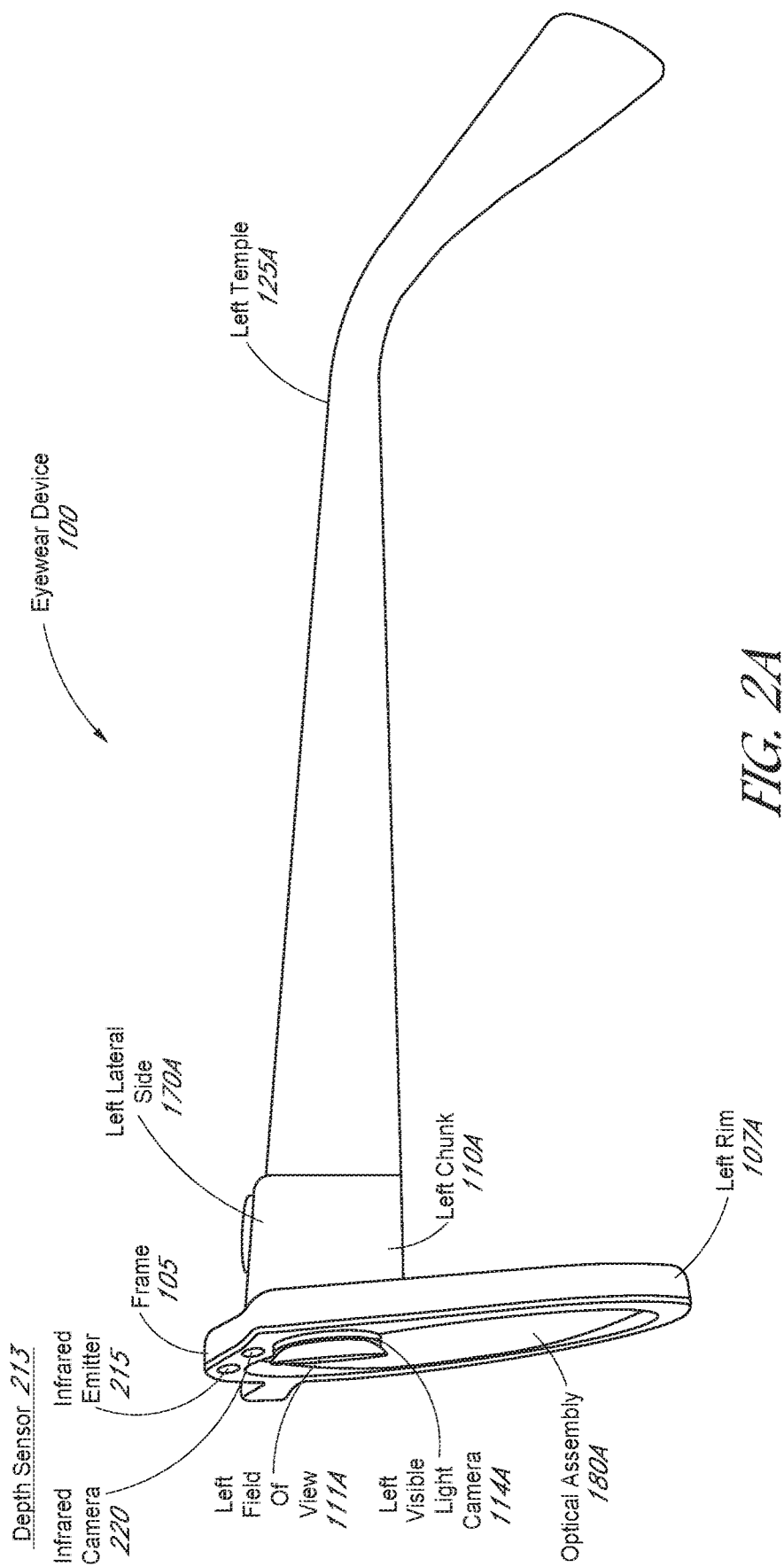
FIG. 2A is a right side view of another example hardware configuration of an eyewear device utilized in the depth sculpturing system, which shows the right visible light camera and a depth sensor of the depth-capturing camera to generate an initial depth image.

FIG. 2A is a right side view of another example hardware configuration of an eyewear device 100 utilized in the depth sculpturing system. As shown, the depth-capturing camera includes a left visible light camera 114A and a depth sensor 213 on a frame 105 to generate an initial depth image. Instead of utilizing at least two visible light cameras 114A-B to generate the initial depth image, here a single visible light camera 114A and the depth sensor 213 are utilized to generate depth images, such as the initial depth image. As in the example of FIGS. 1A-D, two-dimensional input from a user is applied to an initial depth image to generate a depth sculptured image. The infrared camera 220 of the depth sensor 213 has an outwards facing field of view that substantially overlaps with the left visible light camera 114A for a line of sight of the eye of the user. As shown, the infrared emitter 215 and the infrared camera 220 are co-located on the upper portion of the left rim 107A with the left visible light camera 114A.

In the example of FIG. 2A, the depth sensor 213 of the eyewear device 100 includes an infrared emitter 215 and an infrared camera 220 which captures an infrared image. Visible light cameras 114A-B typically include a blue light filter to block infrared light detection, in an example, the infrared camera 220 is a visible light camera, such as a low resolution video graphic array (VGA) camera (e.g., 640×480 pixels for a total of 0.3 megapixels), with the blue filter removed. The infrared emitter 215 and the infrared camera 220 are co-located on the frame 105, for example, both are shown as connected to the upper portion of the left rim 107A. As described in further detail below, the frame 105 or one or more of the left and right chunks 110A-B include a circuit board that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107A, or in different locations on the frame 105, for example, the infrared emitter 215 is on the left rim 107B and the infrared camera 220 is on the right rim 107B. However, the at least one visible light camera 114A and the depth sensor 213 typically have substantially overlapping fields of view to generate three-dimensional depth images. In another example, the infrared emitter 215 is on the frame 105 and the infrared camera 220 is on one of the chunks 110A-B, or vice versa. The infrared emitter 215 can be connected essentially anywhere on the frame 105, left chunk 110A, or right chunk 110B to emit a pattern of infrared in the light of sight of the eye of the user. Similarly, the infrared camera 220 can be connected essentially anywhere on the frame 105, left chunk 110A, or right chunk 110B to capture at least one reflection variation in the emitted pattern of infrared light of a three-dimensional scene in the light of sight of the eye of the user.

The infrared emitter 215 and infrared camera 220 are arranged to face outwards to pick up an infrared image of a scene with objects or object features that the user wearing the eyewear device 100 observes. For example, the infrared emitter 215 and infrared camera 220 are positioned directly in front of the eye, in the upper part of the frame 105 or in the chunks 110A-B at either ends of the frame 105 with a forward facing field of view to capture images of the scene which the user is gazing at, for measurement of depth of objects and object features.

In one example, the infrared emitter 215 of the depth sensor 213 emits infrared light illumination in the forward facing field of view of the scene, which can be near-infrared light or other short-wavelength beam of low-energy radiation. Alternatively, or additionally, the depth sensor 213 may include an emitter that emits other wavelengths of light besides infrared and the depth sensor 213 further includes a camera sensitive to that wavelength that receives and captures images with that wavelength. As noted above, the eyewear device 100 is coupled to a processor and a memory, for example in the eyewear device 100 itself or another part of the depth sculpturing system. Eyewear device 100 or the depth sculpturing system can subsequently process the captured infrared image during generation of three-dimensional depth images, such as the initial depth image.

Figure 2B:
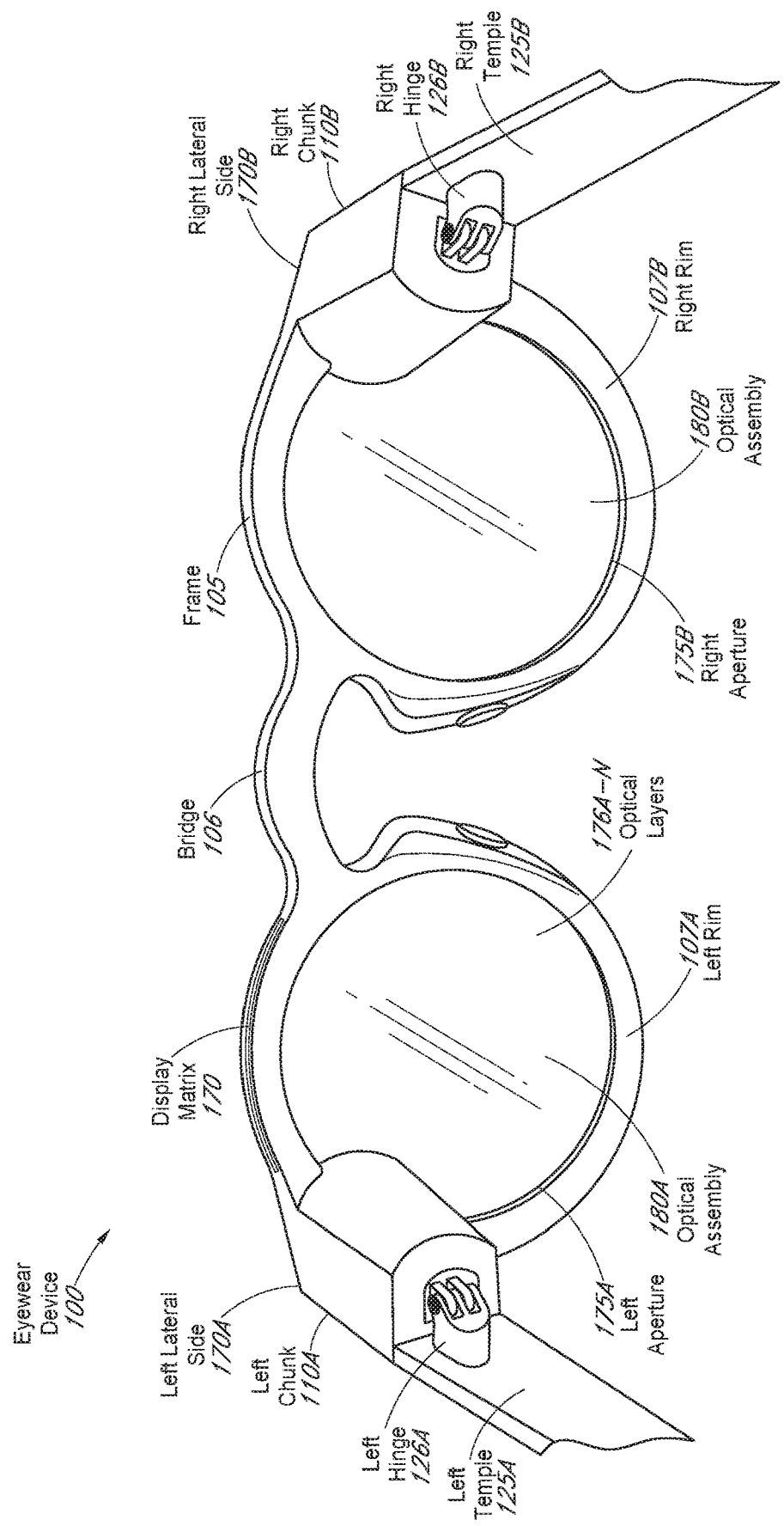

FIGS. 2B-C are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B which hold a respective optical element 180A-B, such as a lens and a display device. As used herein, the term lens is meant to cover transparent or translucent pieces of glass or plastic having curved and/or flat surfaces that cause light to converge/diverge or that cause little or no convergence or divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples (not shown) attached to the frame 105.

In one example, the image display of optical assembly 180A-B includes an integrated image display. As shown in FIG. 2B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 2C. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2B-C, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105.

In one example, the image display includes a first (left) image display and a second (right) image display. Eyewear device 100 includes first and second apertures 175A-B which hold a respective first and second optical assembly 180A-B. The first optical assembly 180A includes the first image display (e.g., a display matrix 170A of FIG. 2B; or optical strips 155A-N' and a projector 150A of FIG. 2C). The second optical assembly 180B includes the second image display e.g., a display matrix 170B of FIG. 2B; or optical strips 155A-N" and a projector 150B of FIG. 2C).

Figure 3:
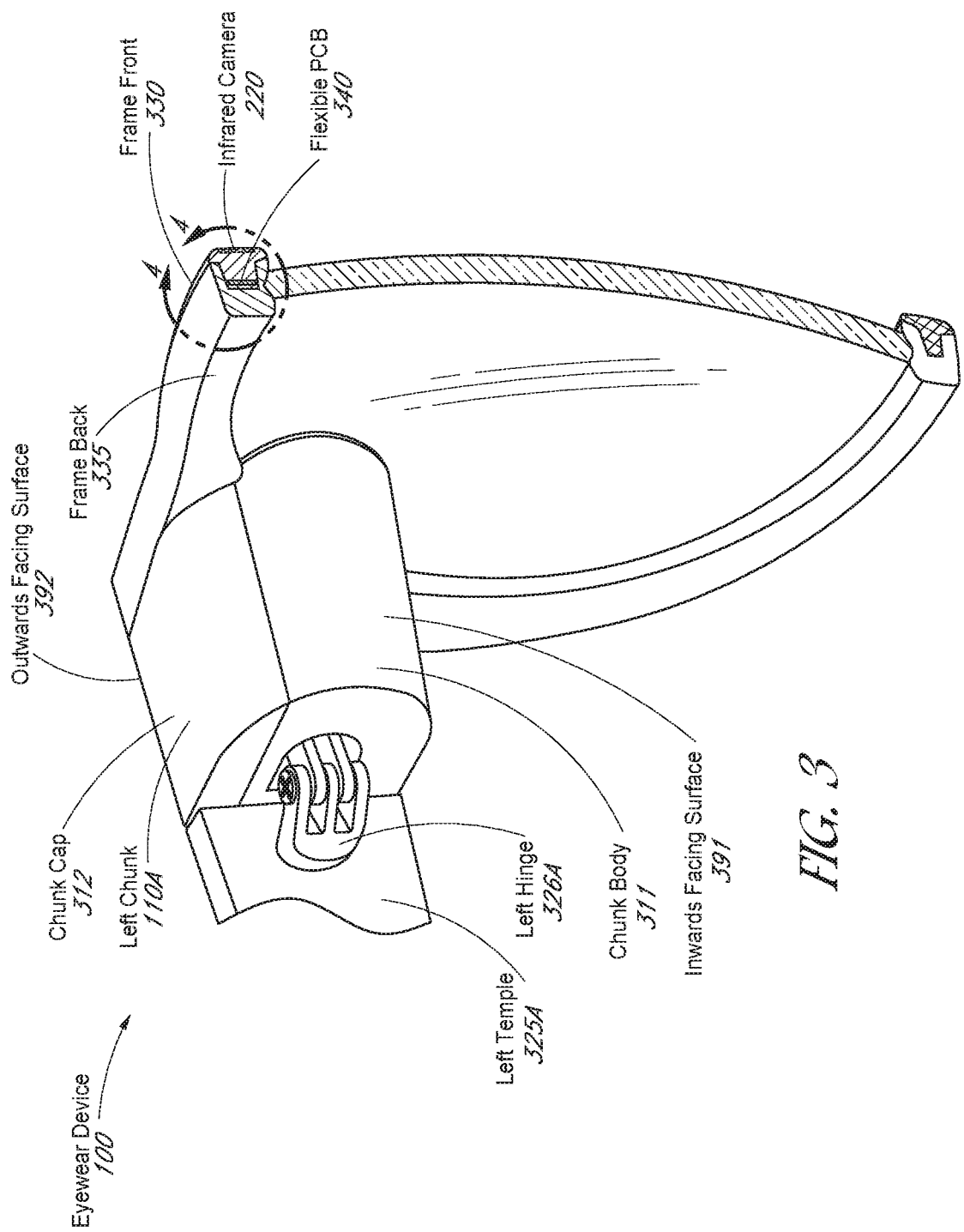
FIG. 3 shows a rear perspective sectional view of the eyewear device of FIG. 2A depicting an infrared camera of the depth sensor, a frame front, a frame back, and a circuit board.

FIG. 3 shows a rear perspective sectional view of the eyewear device of FIG. 2A depicting an infrared camera 220, a frame front 330, a frame back 335, and a circuit board. It can be seen that the upper portion of the left rim 107A of the frame 105 of the eyewear device 100 includes a frame front 330 and a frame back 335. The frame front 330 includes a front-facing side configured to face outwards away from the eye of the user. The frame back 335 includes a rear-facing side configured to face inwards towards the eye of the user. An opening for the infrared camera 220 is formed on the frame front 330.

As shown in the encircled cross-section 4-4 of the upper middle portion of the left rim 107A of the frame 105, a circuit board, which is a flexible printed circuit board (PCB) 340, is sandwiched between the frame front 330 and the frame back 335. Also shown in further detail is the attachment of the left chunk 110A to the left temple 325A via a left hinge 326A. In some examples, components of the depth sensor 213, including the infrared camera 220, the flexible PCB 340, or other electrical connectors or contacts may be located on the left temple 325A or the left hinge 326A.

In an example, the left chunk 110A includes a chunk body 311, a chunk cap 312, an inwards facing surface 391 and an outwards facing surface 392 (labeled, but not visible). Disposed inside the left chunk 110A are various interconnected circuit boards, such as PCBs or flexible PCBs, which include controller circuits for charging a battery, inwards facing light emitting diodes (LEDs), and outwards (forward) facing LEDs. Although shown as being formed on the circuit boards of the left rim 107A, the depth sensor 213, including the infrared emitter 215 and the infrared camera 220, can be formed on the circuit boards of the right rim 107B to captured infrared images utilized in the generation of three-dimensional depth images, for example, in combination with right visible light camera 114B.

Figure 4:
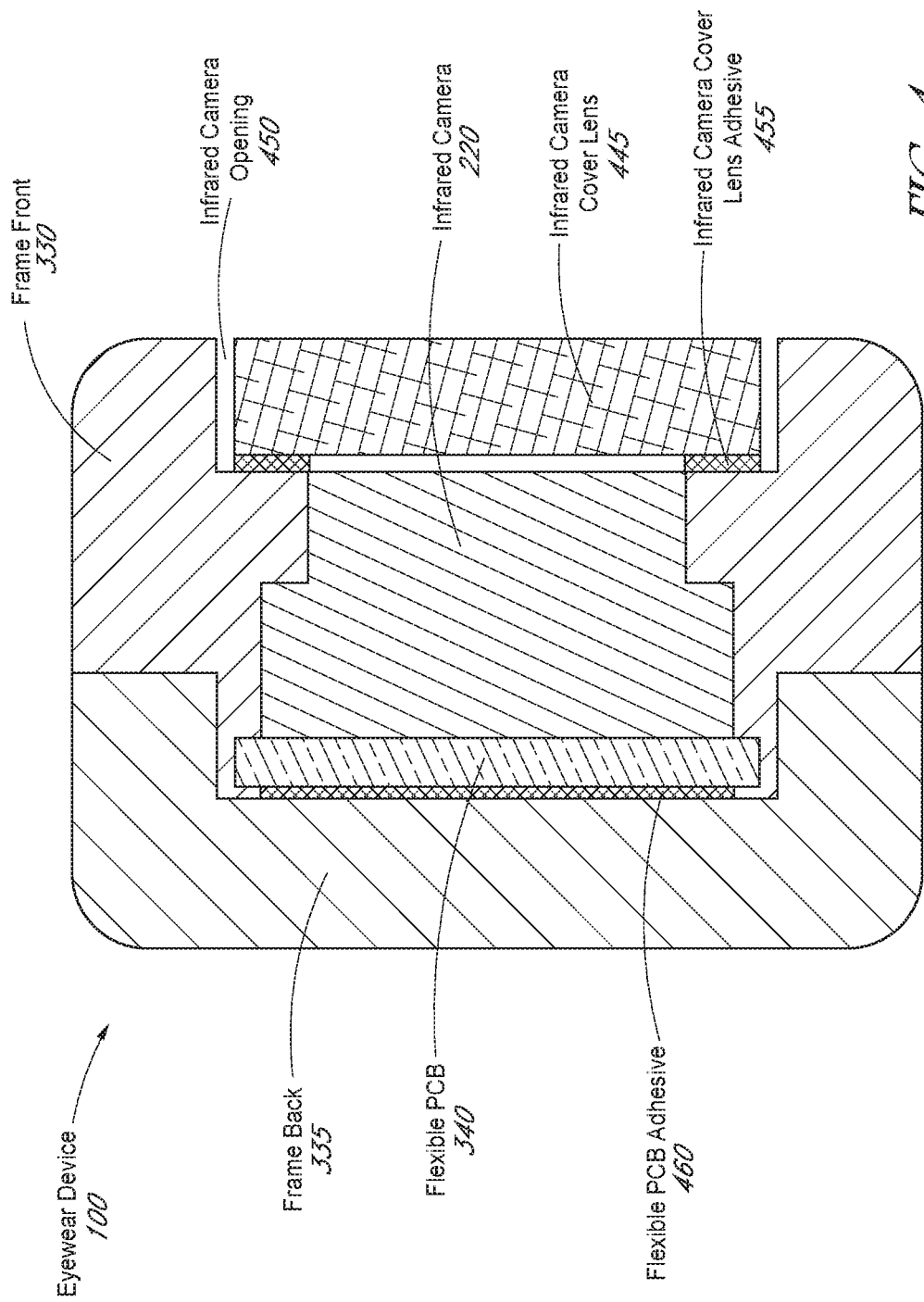
FIG. 4 is a cross-sectional view taken through the infrared camera and the frame of the eyewear device of FIG. 3.

FIG. 4 is a cross-sectional view through the infrared camera 220 and the frame corresponding to the encircled cross-section 4-4 of the eyewear device of FIG. 3. Various layers of the eyewear device 100 are visible in the cross-section of FIG. 4. As shown, the flexible PCB 340 is disposed on the frame back 335 and connected to the frame front 330. The infrared camera 220 is disposed on the flexible PCB 340 and covered by an infrared camera cover lens 445. For example, the infrared camera 220 is reflowed to the back of the flexible PCB 340. Reflowing attaches the infrared camera 220 to electrical contact pad(s) formed on the back of the flexible PCB 340 by subjecting the flexible PCB 340 to controlled heat which melts a solder paste to connect the two components. In one example, reflowing is used to surface mount the infrared camera 220 on the flexible PCB 340 and electrically connect the two components. However, it should be understood that through-holes can be used to connect leads from the infrared camera 220 to the flexible PCB 340 via interconnects, for example.

The frame front 330 includes an infrared camera opening 450 for the infrared camera cover lens 445. The infrared camera opening 450 is formed on a front-facing side of the frame front 330 that is configured to face outwards away from the eye of the user and towards a scene being observed by the user. In the example, the flexible PCB 340 can be connected to the frame back 335 via a flexible PCB adhesive 460. The infrared camera cover lens 445 can be connected to the frame front 330 via infrared camera cover lens adhesive 455. The connection can be indirect via intervening components.

Figure 5:
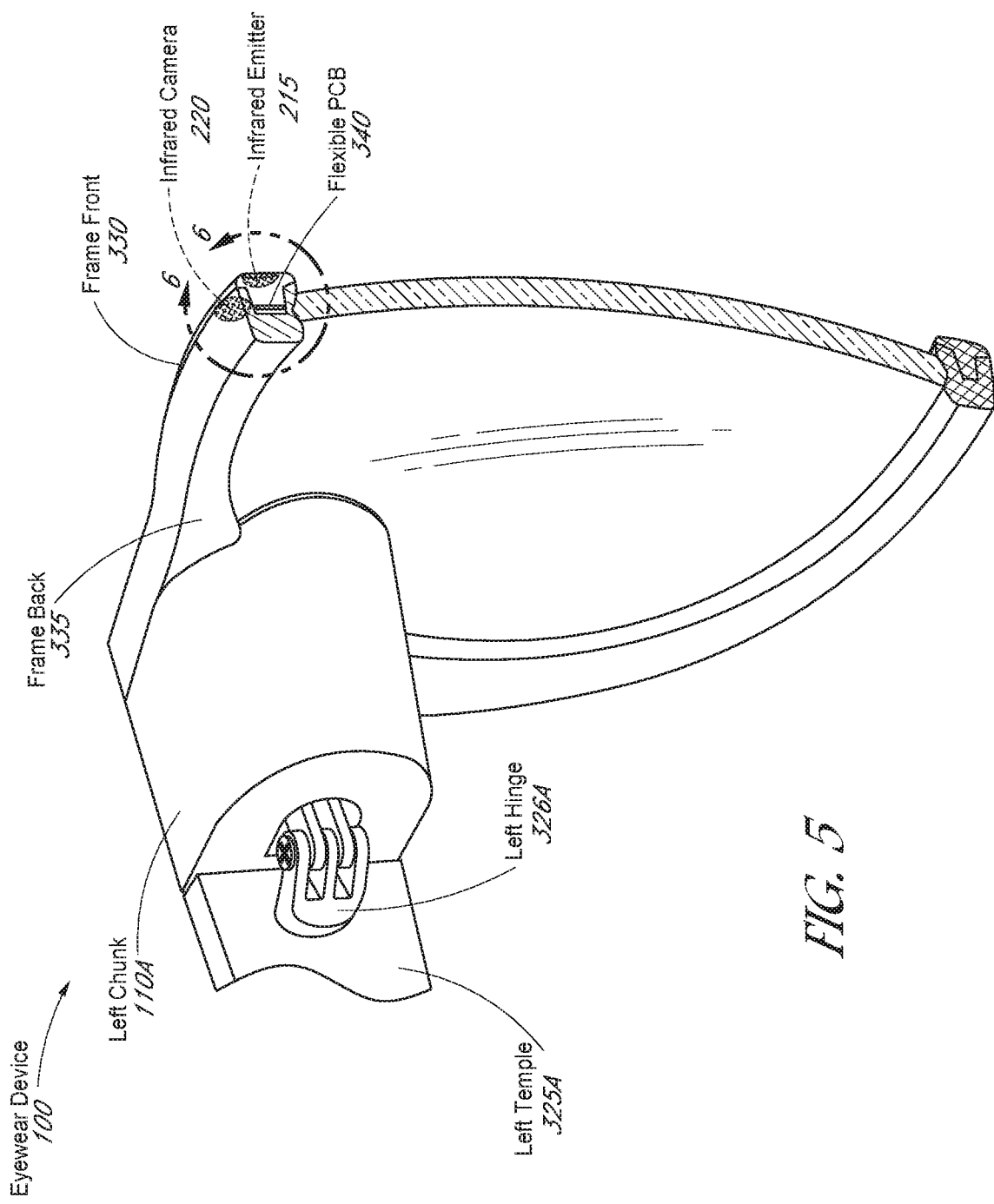
FIG. 5 shows a rear perspective view of the eyewear device of FIG. 2A depicting an infrared emitter of the depth sensor, the infrared camera of the depth sensor, the frame front, the frame back, and the circuit board.

FIG. 5 shows a rear perspective view of the eyewear device of FIG. 2A. The eyewear device 100 includes an infrared emitter 215, infrared camera 220, a frame front 330, a frame back 335, and a circuit board 340. As in FIG. 3, it can be seen in FIG. 5 that the upper portion of the left rim of the frame of the eyewear device 100 includes the frame front 330 and the frame back 335. An opening for the infrared emitter 215 is formed on the frame front 330.

As shown in the encircled cross-section 6-6 in the upper middle portion of the left rim of the frame, a circuit board, which is a flexible PCB 340, is sandwiched between the frame front 330 and the frame back 335. Also shown in further detail is the attachment of the left chunk 110A to the left temple 325A via the left hinge 326A. In some examples, components of the depth sensor 213, including the infrared emitter 215, the flexible PCB 340, or other electrical connectors or contacts may be located on the left temple 325A or the left hinge 326A.

Figure 6:
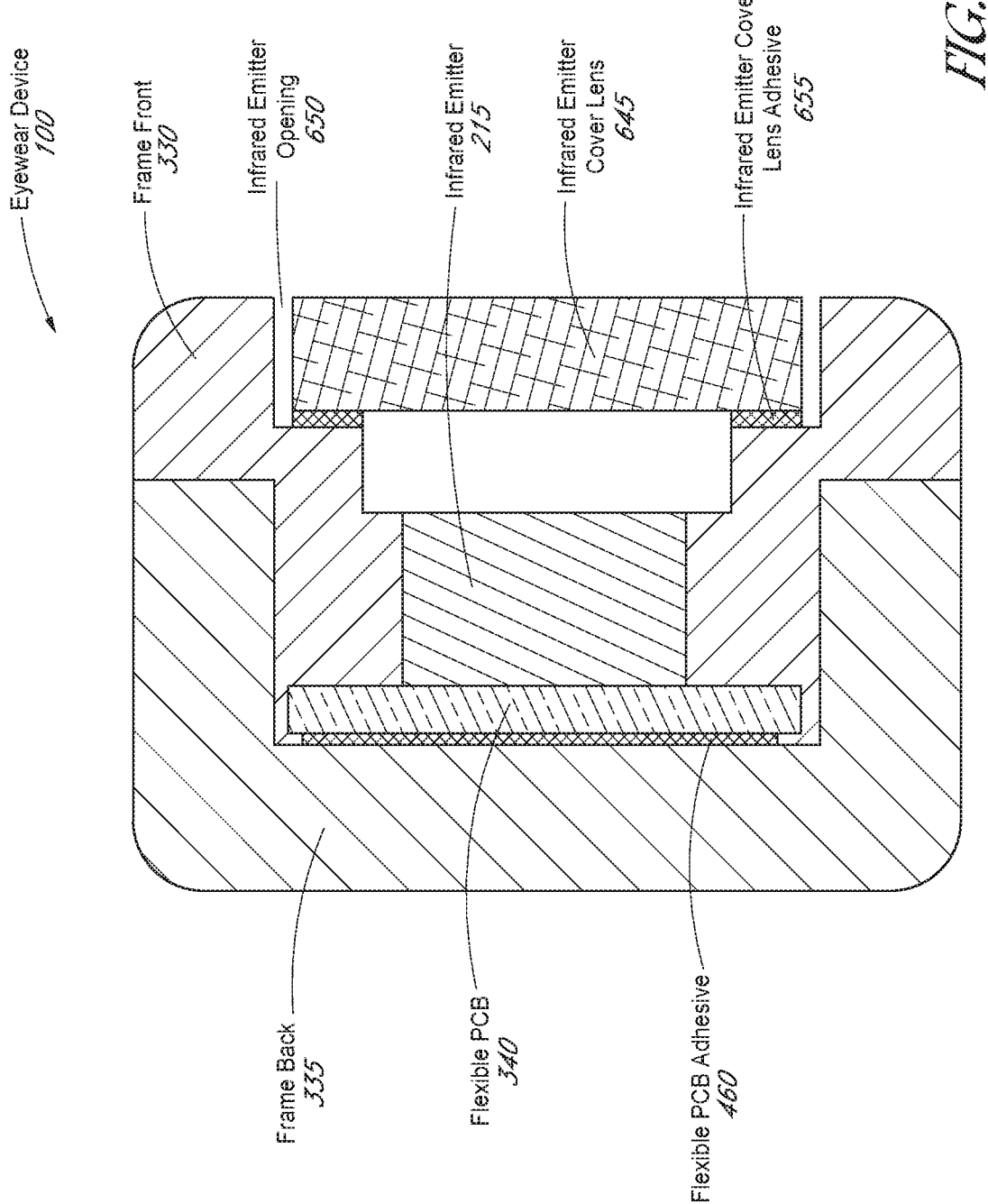
FIG. 6 is a cross-sectional view taken through the infrared emitter and the frame of the eyewear device of FIG. 5.

FIG. 6 is a cross-sectional view through the infrared emitter 215 and the frame corresponding to the encircled cross-section 6-6 of the eyewear device of FIG. 5. Multiple layers of the eyewear device 100 are illustrated in the cross-section of FIG. 6, as shown the frame 105 includes the frame front 330 and the frame back 335. The flexible PCB 340 is disposed on the frame back 335 and connected to the frame front 330. The infrared emitter 215 is disposed on the flexible PCB 340 and covered by an infrared emitter cover lens 645. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame front 330 includes an infrared emitter opening 650 for the infrared emitter cover lens 645. The infrared emitter opening 650 is formed on a front-facing side of the frame front 330 that is configured to face outwards away from the eye of the user and towards a scene being observed by the user. In the example, the flexible PCB 340 can be connected to the frame back 335 via the flexible PCB adhesive 460. The infrared emitter cover lens 645 can be connected to the frame front 330 via infrared emitter cover lens adhesive 655. The coupling can also be indirect via intervening components.

Figure 7:
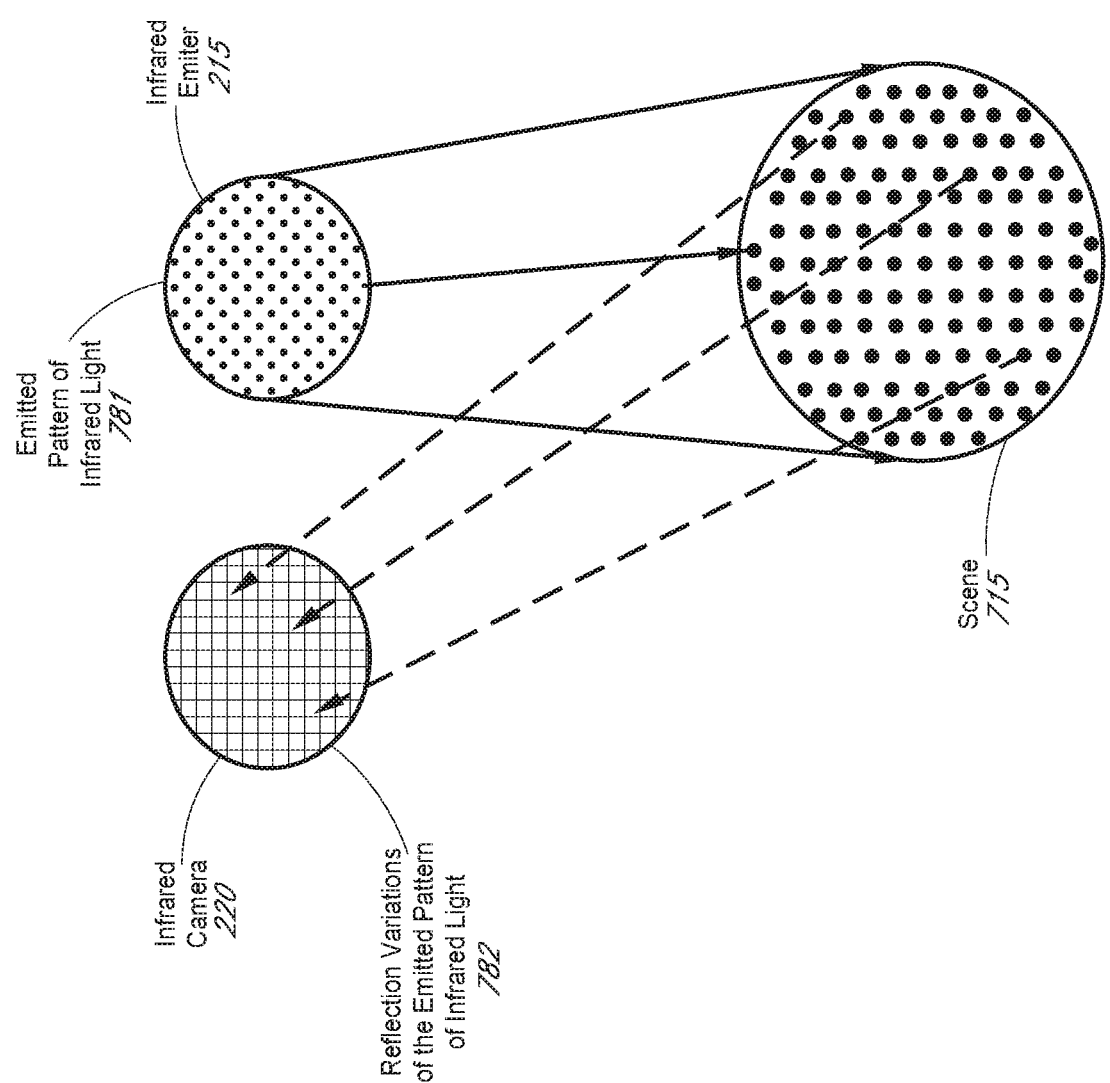
FIG. 7 depicts an example of a pattern of infrared light emitted by the infrared emitter of the depth sensor and reflection variations of the emitted pattern of infrared light captured by the infrared camera of the depth sensor of the eyewear device to measure depth of pixels in a raw image to generate the initial depth image.

FIG. 7 depicts an example of an emitted pattern of infrared light 781 emitted by an infrared emitter 215 of the depth sensor 213. As shown, reflection variations of the emitted pattern of infrared light 782 are captured by the infrared camera 220 of the depth sensor 213 of the eyewear device 100 as an infrared image. The reflection variations of the emitted pattern of infrared light 782 is utilized to measure depth of pixels in a raw image (e.g., left raw image) to generate a three-dimensional depth image, such as the initial depth image.

Depth sensor 213 in the example includes the infrared emitter 215 to project a pattern of infrared light and the infrared camera 220 to capture infrared images of distortions of the projected infrared light by objects or object features in a space, shown as scene 715 being observed by the wearer of the eyewear device 100. The infrared emitter 215, for example, may blast infrared light 781 which falls on objects or object features within the scene 715 like a sea of dots. In some examples, the infrared light is emitted as a line pattern, a spiral, or a pattern of concentric rings or the like. Infrared light is typically not visible to the human eye. The infrared camera 220 is similar to a standard red, green, and blue (RGB) camera but receives and captures images of light in the infrared wavelength range. For depth sensing, the infrared camera 220 is coupled to an image processor (element 912 of FIG. 9) and the depth sculpturing programming (element 945) that judge time of flight based on the captured infrared image of the infrared light. For example, the distorted dot pattern 782 in the captured infrared image can then be processed by an image processor to determine depth from the displacement of dots. Typically, nearby objects or object features have a pattern with dots spread further apart and far away objects have a denser dot pattern. It should be understood that the foregoing functionality can be embodied in programming instructions of depth sculpturing programming or application (element 945) found in one or more components of the system.

Figure 8A:
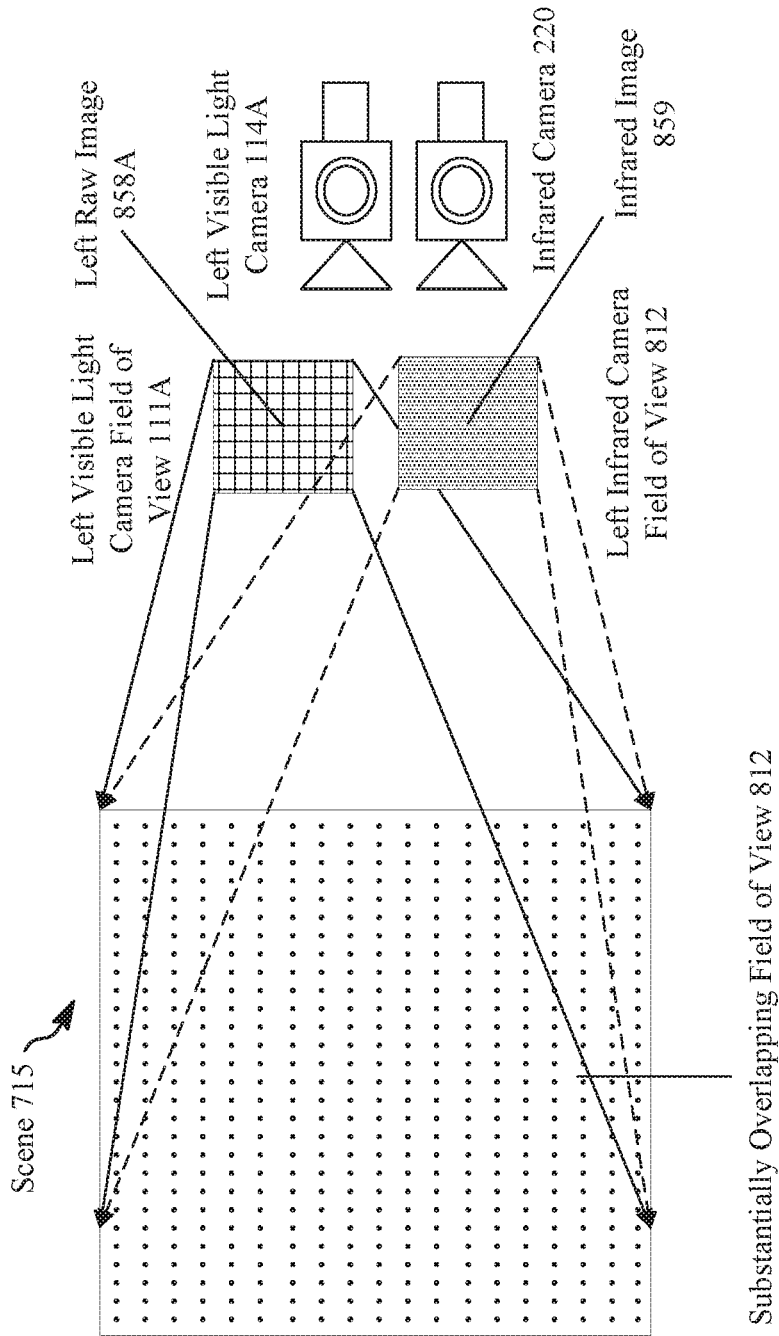
FIG. 8A depicts an example of infrared light captured by the infrared camera of the depth sensor as an infrared image and visible light captured by a visible light camera as a raw image to generate the initial depth image of a three-dimensional scene.

FIG. 8A depicts an example of infrared light captured by the infrared camera 220 of the depth sensor 213 with a left infrared camera field of view 812. Infrared camera 220 captures reflection variations in the emitted pattern of infrared light 782 in the three-dimensional scene 715 as an infrared image 859. As further shown, visible light is captured by the left visible light camera 114A with a left visible light camera field of view 111A as a left raw image 858A. Based on the infrared image 859 and left raw image 858A, the three-dimensional initial depth image of the three-dimensional scene 715 is generated.

Figure 8B:
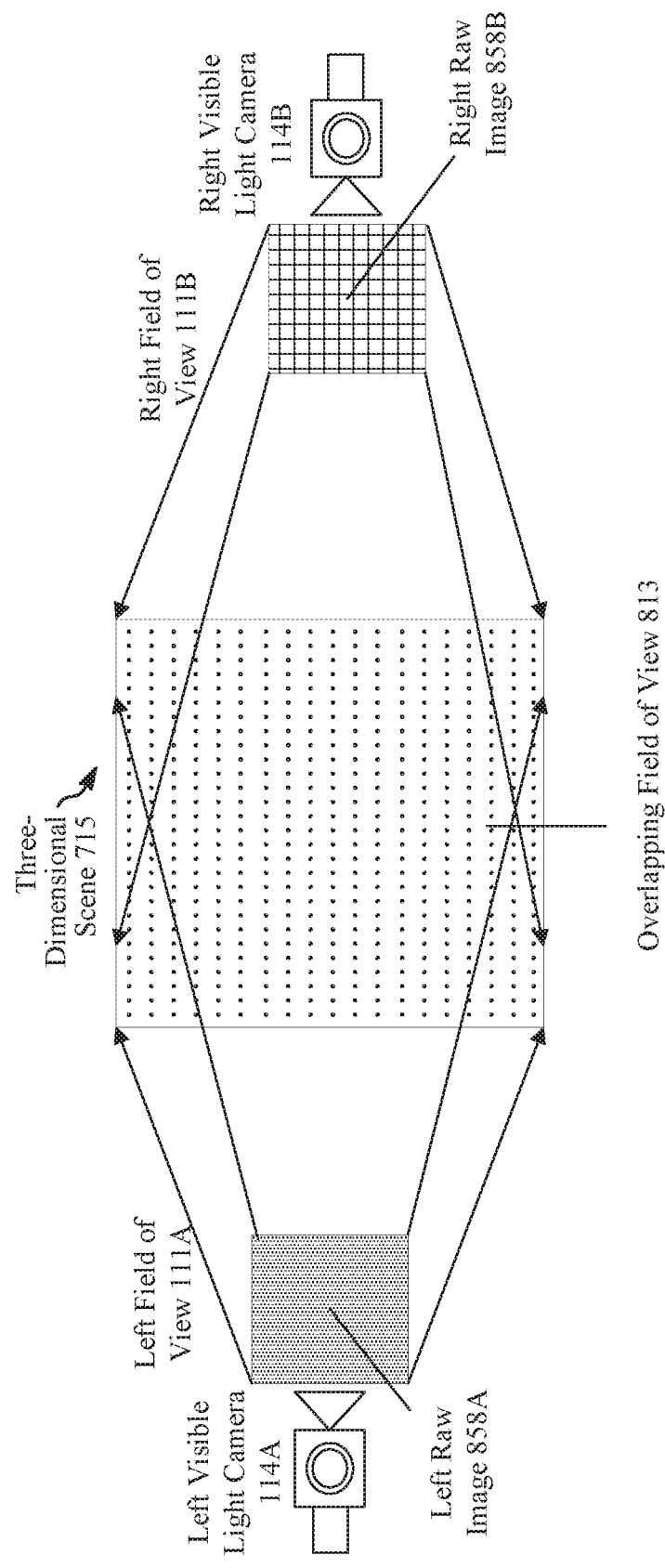
FIG. 8B depicts an example of visible light captured by the left visible light camera as left raw image and visible light captured by the right visible light camera as a right raw image to generate the initial depth image of a three-dimensional scene.

FIG. 8B depicts an example of visible light captured by the left visible light camera 114A and visible light captured with a right visible light camera 114B. Visible light is captured by the left visible light camera 114A with a left visible light camera field of view 111A as a left raw image 858A. Visible light is captured by the right visible light camera 114B with a right visible light camera field of view 111B as a right raw image 858B. Based on the left raw image 858A and the right raw image 858B, the three-dimensional initial depth image of the three-dimensional scene 715 is generated.

Figure 9:
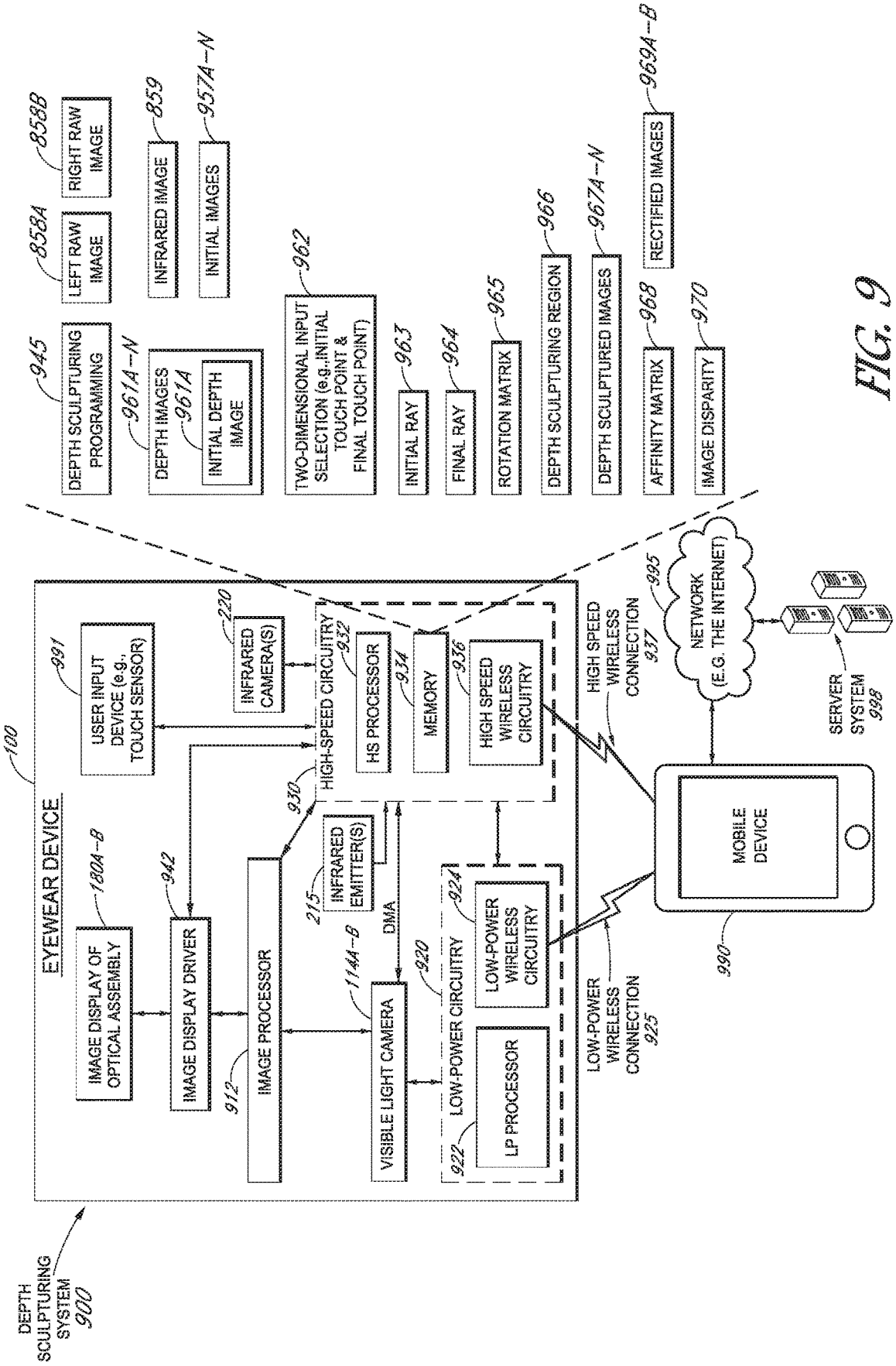
FIG. 9 is a high-level functional block diagram of an example depth sculpturing system including the eyewear device with a depth-capturing camera to generate the initial depth image and a user input device (e.g., touch sensor), a mobile device, and a server system connected via various networks.

FIG. 9 is a high-level functional block diagram of an example depth sculpturing system 900, which includes a wearable device (e.g., the eyewear device 100), a mobile device 990, and a server system 998 connected via various networks. Eyewear device 100 includes a depth-capturing camera, such as at least one of the visible light cameras 114A-B; and the depth sensor 213, shown as infrared emitter 215 and infrared camera 220. The depth-capturing camera can alternatively include at least two visible light cameras 114A-B (one associated with the left lateral side 170A and one associated with the right lateral side 170B). Depth-capturing camera generates an initial depth image 961A of depth images 961A-N, which are rendered three-dimensional (3D) models that are texture mapped images of a red, green, and blue (RGB) imaged scene (e.g., derived from the initial images 957A-N).

Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 further includes two image displays of the optical assembly 180A-B (one associated with the left lateral side 170A and one associated with the right lateral side 170B). Eyewear device 100 also includes image display driver 942, image processor 912, low-power circuitry 920, and high-speed circuitry 930. Image display of optical assembly 180A-B are for presenting images, such as initial images 957A-N and depth sculptured images 967A-N. Image display driver 942 is coupled to the image display of optical assembly 180A-B to control the image display of optical assembly 180A-B to present the images, such as initial images 957A-N and depth sculptured images 967A-N. Eyewear device 100 further includes a user input device 991 (e.g., touch sensor) to receive a two-dimensional input selection from a user.

The components shown in FIG. 9 for the eyewear device 100 are located on one or more circuit boards, for example a PCB or flexible PCB, in the rims or temples. Alternatively or additionally, the depicted components can be located in the chunks, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eyewear device includes 100 includes a memory 934 which includes depth sculpturing programming 945 to perform a subset or all of the functions described herein for depth sculpturing, in which a two-dimensional input selection from a user is applied to an initial depth image to generate a depth sculptured image. As shown, memory 934 further includes a left raw image 858A captured by left visible light camera 114A, a right raw image 858B captured by right visible light camera 114B, and an infrared image 859 captured by infrared camera 220 of the depth sensor 213.

Figure 11:
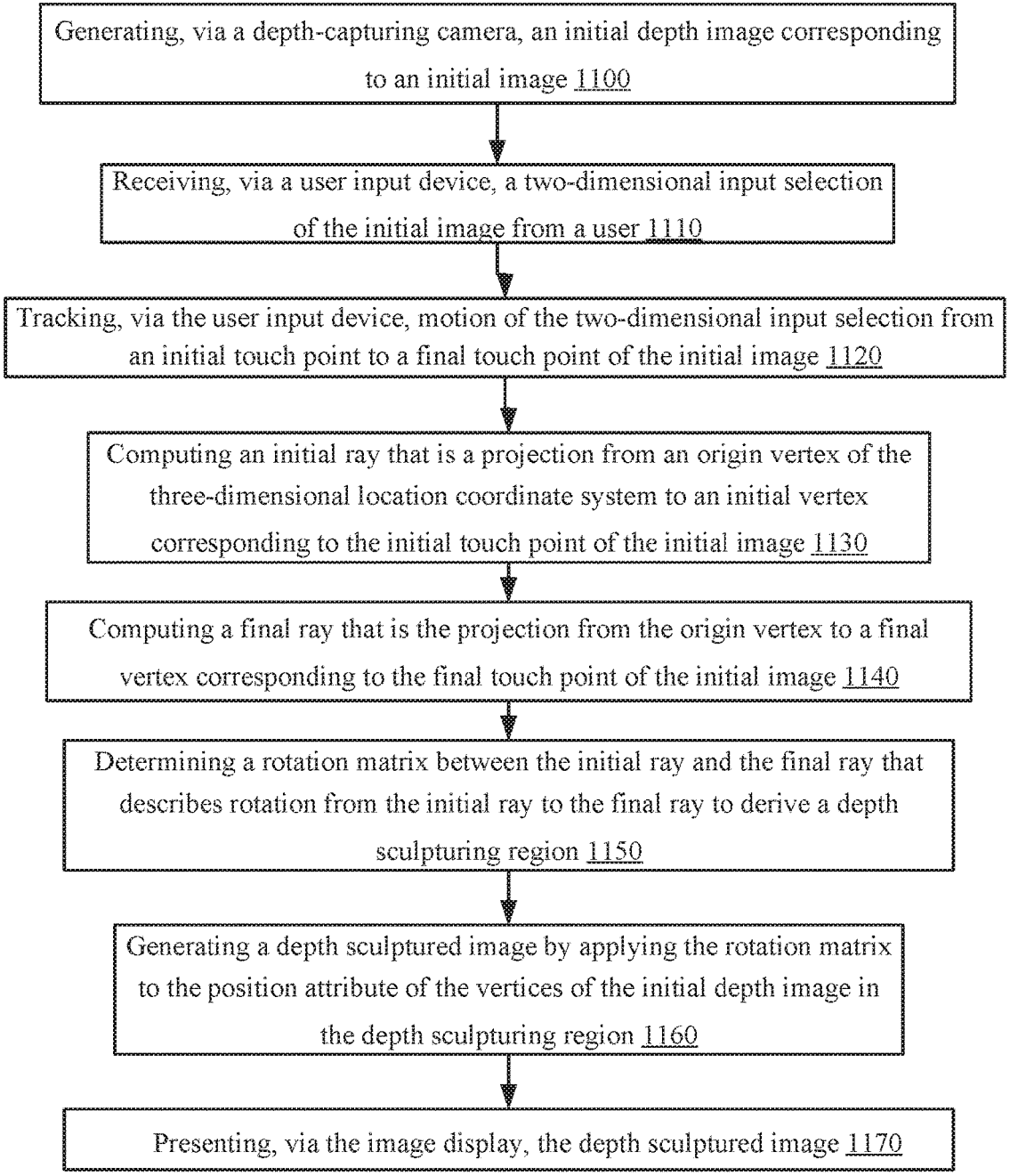
FIG. 11 is a flowchart of a method that can be implemented in the depth sculpturing system to apply the two-dimensional input selection from the user to the initial depth image to generate the depth sculptured image.

Memory 934 further includes multiple depth images 961A-N, including initial depth image 961A, which are generated, via the depth-capturing camera. A flowchart outlining functions which can be implemented in the depth sculpturing programming 945 is shown in FIG. 11. Memory 934 further includes a two-dimensional input selection 962 (e.g., an initial touch point and a final touch point) received by the user input device 991. Memory 934 further includes an initial ray 963, a final ray 964, a rotation matrix 965, a depth sculpturing region 966, an affinity matrix 968, left and right rectified images 969A-B (e.g., to remove vignetting towards the end of the lens), and an image disparity 970, all of which are generated during image processing of the depth images 961A-N (e.g., initial depth image 961A) to generate respective depth sculptured images 967A-N (e.g., depth sculptured image 967A).

During transformation, vertices of the initial depth image 961A are obtained based on the initial touch point and final touch point of the two-dimensional input selection 962. When a vertex is selected and dragged as the initial touch point, the vertex is being dragged in three-dimensional (3D) space. Because the user input received via the user input device 991, 1091 is in two-dimensional (2D) space, that vertex is then dragged in 3D space with the 2D input by rotation. If a ray is shot through the pixels, there are radial rays with respect to the depth-capturing camera using a radial camera model that shoots into the 3D space of the initial depth image 961A. For example, assume a pixel X1 corresponds to the initial touch point and has an initial ray 963. Now assume a different pixel X2 corresponds to the final touch point and has a final ray 964. A rotation can be described between the pixel X1 (first touch point) and pixel X2 (final touch point). The rotation matrix 965 between the initial ray 963 and final ray 964 can be computed that describes the rotation between the initial touch point (first touch point) and the final touch point (last touch point). Rotation matrix 965 is applied to the 3D space Z location coordinate for depth by multiplying the vector by the rotation matrix 965, to obtain new Z location coordinate in 3D space. But the 2D location coordinates (X and Y) in the depth sculptured image 967A still correspond to X2 (last touch point). This transformation creates an arc along which the vertex X1 is moved, and a new updated mesh (depth sculptured image 967A) is obtained, with an updated location for vertices. The updated mesh can be displayed from either the original camera viewpoint or a different view as the depth sculptured image 967A.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain embodiments, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain embodiments, high-speed wireless circuitry 936 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, camera data generated by the left and right visible light cameras 114A-B, infrared camera 220, and the image processor 912, as well as images generated for display by the image display driver 942 on the image displays of the optical assembly 180A-B. While memory 934 is shown as integrated with high-speed circuitry 930, in other embodiments, memory 934 may be an independent standalone element of the eyewear device 100. In certain such embodiments, electrical routing lines may provide a connection through a chip that includes the high-speed processor 932 from the image processor 912 or low-power processor 922 to the memory 934. In other embodiments, the high-speed processor 932 may manage addressing of memory 934 such that the low-power processor 922 will boot the high-speed processor 932 any time that a read or write operation involving memory 934 is needed.

Figure 10:
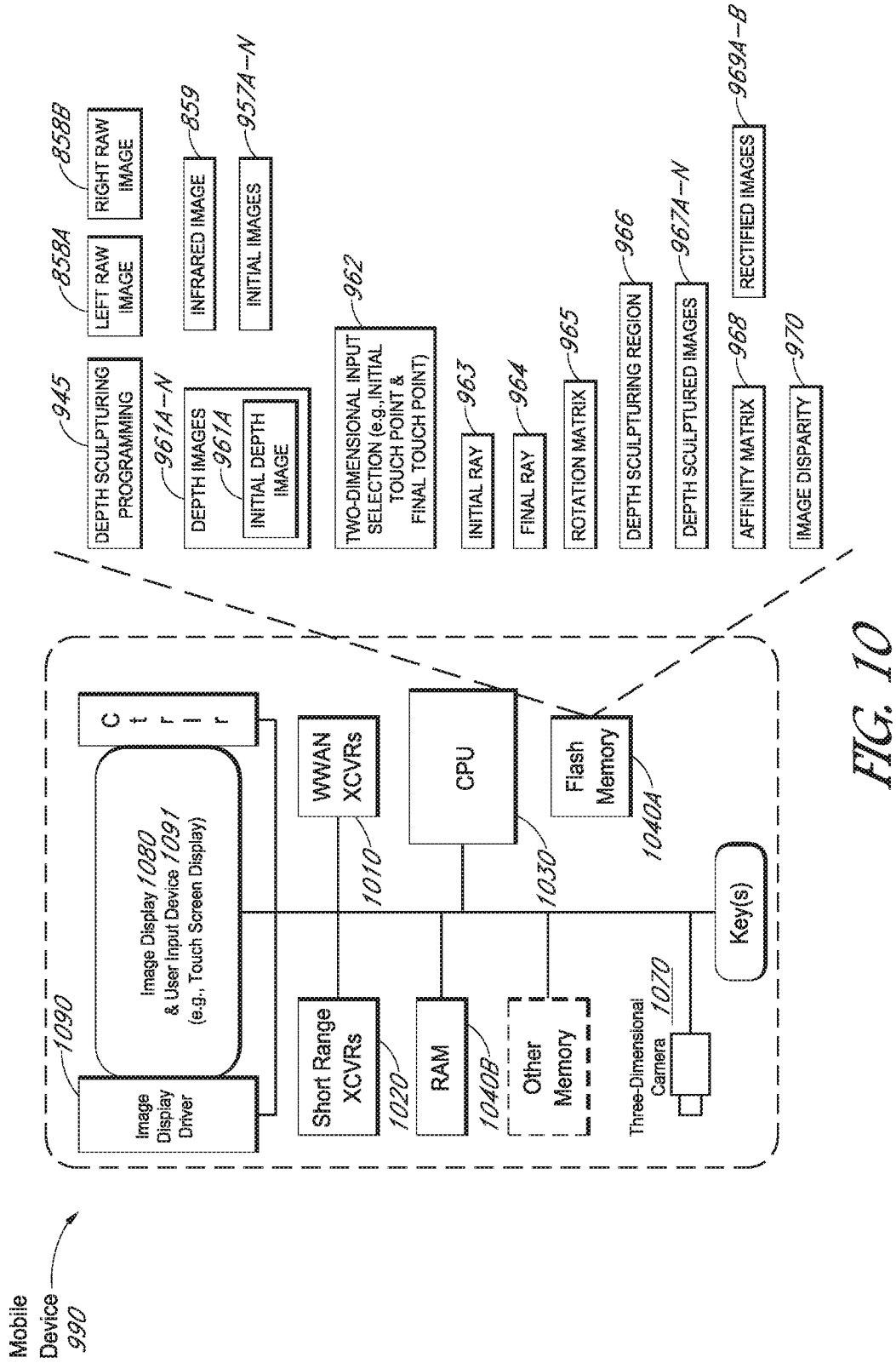
FIG. 10 shows an example of a hardware configuration for the mobile device of the depth sculpturing system of FIG. 9, which includes a user input device (e.g., touch screen device) to receive the two-dimensional input selection to apply to the initial depth image to generate a depth sculptured image.

As shown in FIG. 9, the processor 932 of the eyewear device 100 can be coupled to the depth-capturing camera (visible light cameras 114A-B; or visible light camera 114A, infrared emitter 215, and infrared camera 220), the image display driver 942, the user input device 991, and the memory 934. As shown in FIG. 10, the processor 1030 of the mobile device 990 can be coupled to the depth-capturing camera 1070, the image display driver 1090, the user input device 1091, and the memory 1040A. Eyewear device 100 can perform all or a subset of any of the following functions described below as a result of the execution of the depth sculpturing programming 945 in the memory 934 by the processor 932 of the eyewear device 100. Mobile device 990 can perform all or a subset of any of the following functions described below as a result of the execution of the depth sculpturing programming 945 in the memory 1040A by the processor 1030 of the mobile device 990. Functions can be divided in the depth sculpturing system 900, such that the eyewear device 100 generates the depth images 961A-N, but the mobile device 990 performs the remainder of the image processing on the depth images 961A-N to generate the sculptured depth images 967A-N.

Execution of the depth sculpturing programming 945 by the processor 932, 1030 configures the depth sculpturing system 900 to perform functions, including functions to generate, via the depth-capturing camera, an initial depth image 961A corresponding to the initial image 957A. The initial depth image 961A is formed of a matrix of vertices. Each vertex represents a pixel in a three-dimensional scene 715. Each vertex has a position attribute. The position attribute of each vertex is based on a three-dimensional location coordinate system and includes an X location coordinate on an X axis for horizontal position, a Y location coordinate on a Y axis for vertical position, and a Z location coordinate on a Z axis for depth. Each vertex further includes one or more of a color attribute, a texture attribute, or a reflectance attribute.

Depth sculpturing system 900 presents, via the image display 180A-B, 1080 the initial image 957A. Eyewear device 100 receives, via the user input device 991, 1091, the two-dimensional input selection 962 of the presented initial image 957A from the user. Depth sculpturing system 900 tracks, via the user input device 991, 1091, motion of the two-dimensional input selection 962 from an initial touch point to a final touch point of the presented initial image 957A.

Depth sculpturing system 900 computes an initial ray 963 that is a projection from an origin vertex of the three-dimensional location coordinate system to an initial vertex corresponding to the initial touch point of the presented initial image 957A. The origin vertex corresponds to the depth-capturing camera. Depth sculpturing system 900 computes a final ray 964 that is the projection from the origin vertex to a final vertex corresponding to the final touch point of the presented initial image 957A. Depth sculpturing system 900 determines a rotation matrix 965 between the initial ray 963 and the final ray 964 that describes rotation from the initial ray to the final ray to derive a depth sculpturing region 966. Depth sculpturing system 900 generates a depth sculptured image 967A by applying the rotation matrix 965 to the position attribute of the vertices of the initial depth image 961A in the depth sculpturing region 966. Depth sculpturing system 900 presents, via the image display 180A-B, 1080, the depth sculptured image 967A.

Transformation means applying a rotation matrix to real world three-dimensional coordinates of the initial depth image 961A, where the origin vertex is a three-dimensional positon of the depth-capturing camera, e.g., X, Y, Z=(0, 0, 0). The two-dimensional movement of the two-dimensional input selection 962 on the user input device 991, 1091, essentially describes a rotation around this center of rotation. Such depth sculpturing provides an intuitive way of interacting with and editing three-dimensional depth images 961A-N utilizing the two-dimensional input selection 962 (e.g., two-dimensional space).

In one example of the depth sculpturing system 900, the processor comprises a first processor 932 and a second processor 1030. The memory comprises a first memory 934 and a second memory 1040A. The eyewear device 100 includes a first network communication 924 or 936 interface for communication over a network 925 or 937 (e.g., a wireless short-range network or a wireless local area network), the first processor 932 coupled to the first network communication interface 924 or 936, and the first memory 934 accessible to the first processor 932. Eyewear device 100 further includes depth sculpturing programming 945 in the first memory 934. Execution of the depth sculpturing programming 945 by the first processor 932 configures the eyewear device 100 to perform the function to generate, via the depth-capturing camera, the initial depth image 961A corresponding to the initial image 957A.

The depth sculpturing system 900 further comprises a host computer, such as the mobile device 990, coupled to the eyewear device 100 over the network 925 or 937. The host computer includes a second network communication interface 1010 or 1020 for communication over the network 925 or 937, the second processor 1030 coupled to the second network communication interface 1010 or 1020, and the second memory 1040A accessible to the second processor 1030. Host computer further includes depth sculpturing programming 945 in the second memory 1040A.

Execution of the depth sculpturing programming 945 by the second processor 1030 configures the host computer to perform the functions to receive, via the second network communication interface 1010 or 1020, the initial depth image 961A over the network from the eyewear device 100. Execution of the depth sculpturing programming 945 by the second processor 1030 configures the host computer to present, via the image display 1080, the initial image 957A. Execution of the depth sculpturing programming 945 by the second processor 1030 configures the host computer to receive, via the user input device 1091 (e.g., touch screen or a computer mouse), the two-dimensional input selection 962 from the user. Execution of the depth sculpturing programming 945 by the second processor 1030 configures the host computer to track, via the user input device 1091, motion of the two-dimensional input selection 962 from the initial touch point to the final touch point. Execution of the depth sculpturing programming 945 by the second processor 1030 configures the host computer to compute the initial ray 963. Execution of the depth sculpturing programming 945 by the second processor 1030 configures the host computer to compute the final ray 964. Execution of the depth sculpturing programming 945 by the second processor 1030 configures the host computer to determine the rotation matrix 965 between the initial ray 963 and the final ray 964 that describes rotation between the initial ray and the final ray. Execution of the depth sculpturing programming 945 by the second processor 1030 configures the host computer to generate the depth sculptured image 967A by applying the rotation matrix 965 to the position attribute of the vertices of the initial depth image 961A. Execution of the depth sculpturing programming 945 by the second processor 1030 configures the host computer to present, via the image display 1080, the depth sculptured image 967A.

In the example, depth sculpturing system 900 computes an affinity matrix 968 for the vertices of the initial depth image 961A around the initial vertex and the final vertex that determines an influence weight of the rotation matrix 965 on each of the vertices. Generating the depth sculptured image 967A by applying the rotation matrix 965 to the position attribute of the vertices of the initial depth image 961A in the depth sculpturing region 966 is based on the computed affinity matrix 968. If the rotation matrix 965 is applied to a single vertex, a spike or pinch will occur. In order to generate a smooth (curvy) depth sculptured image 967A, the affinity matrix 968 is computed as a region of influence around the touch point. For the initial touch point, a circle can be set with a specific radius. Then the amount or affinity of each vertex to the center of the circle (like a segmentation) is computed (e.g., utilizing edge detection), so each vertex has a weight between zero and one as to how the vertex is influenced by rotation matrix 965. Essentially each vertex moves according to this weight. If the weight is one, the vertex is transformed according to the rotation matrix 965. If the weight is zero, the vertex does not move. If the weight is one-half, the vertex will come halfway between the original position and the transformed position.

In one example, the depth-capturing camera of the eyewear device 100 includes the at least two visible light cameras comprised of a left visible light camera 114A with a left field of view 111A and a right visible light camera 114B with a right field of view 111B. The left field of view 111A and the right field of view 111B have an overlapping field of view 813 (see FIG. 8B). The depth-capturing camera 1070 of the mobile device 990 can be similarly structured.

Generating, via the depth-capturing camera, the initial depth image 961A can include all or a subset of the following functions. First, capturing, via the left visible light camera 114A, a left raw image 858A that includes a left matrix of pixels. Second, capturing, via the right visible light camera 114B, a right raw image 858B that includes a right matrix of pixels. Third, creating a left rectified image 969A from the left raw image 858A and a right rectified image 969B from the right raw image 858B that align the left and right raw images 858A-B and remove distortion from a respective lens (e.g., at the edges of the lens from vignetting) of each of the left and right visible light cameras 114A-B. Fourth, extracting an image disparity 970 by correlating pixels in the left rectified image 969A with the right rectified image 969B to calculate a disparity for each of the correlated pixels. Fifth, calculating the Z location coordinate of vertices of the initial depth image 961A based on at least the extracted image disparity 970 for each of the correlated pixels. Correlation of the left and right pixels can be achieved with Semi-Global Block Matching (SGBM), for example.

In an example, the depth-capturing camera of the eyewear device 100 includes the at least one visible light camera 114A and the depth sensor 213 (e.g., infrared emitter 215 and infrared camera 220). The at least one visible light camera 114A and the depth sensor 213 have a substantially overlapping field of view 812 (see FIG. 8A). The depth sensor 213 includes an infrared emitter 215 and an infrared camera 220. The infrared emitter 215 is connected to the frame 105 or the temple 125A-B to emit a pattern of infrared light. The infrared camera 220 is connected to the frame 105 or the temple 125A-B to capture reflection variations in the emitted pattern of infrared light. The depth-capturing camera 1070 of the mobile device 990 can be similarly structured.

Generating, via the depth-capturing camera, the initial depth image 961A can include all or a subset of the following functions. First, capturing, via the at least one visible light camera 114A, a raw image 858A. Second, emitting, via the infrared emitter 215, a pattern of infrared light 781 on a plurality of objects or object features located in a scene 715 that are reached by the emitted infrared light 781. Third, capturing, via the infrared camera 220, an infrared image 859 of reflection variations of the emitted pattern of infrared light 782 on the plurality of objects or object features. Fourth, computing a respective depth from the depth-capturing camera to the plurality of objects or object features, based on the infrared image 859 of reflection variations. Fifth, correlating objects or object features in the infrared image 859 of reflection variations with the raw image 858A. Sixth, calculating the Z location coordinate of vertices of the initial depth image 961A based on, at least, the computed respective depth.

In an example, generating the depth sculptured image 967A by applying the rotation matrix 965 to the position attribute of the vertices of the initial depth image 961A includes multiplying each vertex of the initial depth image 961A by the rotation matrix 965 to obtain a new X location coordinate, a new Y location coordinate, and a new Z location coordinate on the three-dimensional location coordinate system.

The depth sculptured image 967A is one of a sequence of depth sculptured images 967A-N which are iteratively generated in succession. In some examples, depth sculpturing system 900 iteratively performs all or a subset of the functions to generate each of the sequence of depth sculptured images 967A-N. First, in response to presenting, via the image display 180A-B, 1080, the depth sculptured image 967A, depth sculpturing system 900 receives, via the user input device 991, 1091, a next two-dimensional input selection 962B of the depth sculptured image 967A from the user. Second, depth sculpturing system 900 tracks, via the user input device 991, 1091, motion of the next two-dimensional input selection 962B from a next initial touch point to a next final touch point of the presented depth sculptured image 967A. Third, depth sculpturing system 900 computes a next initial ray 963B that is the projection from the origin vertex of the three-dimensional location coordinate system to a next initial vertex corresponding to the next initial touch point on the depth sculptured image 967A. Fourth, depth sculpturing system 900 computes a next final ray 964B that is the projection from the origin vertex to a next final vertex corresponding to the next final touch point of the presented depth sculptured image 967A. Fifth, depth sculpturing system 900 determines a next rotation matrix 965B between the next initial ray 963B and the next final ray 964B that describes rotation from the next initial ray 963B to the next final ray 964B of the presented depth sculptured image 967A to derive a next depth sculpturing region 966B. Sixth, depth sculpturing system 900 generates a next depth sculptured image 967B by applying the next rotation matrix 965B to the position attribute of the vertices of the depth sculptured image 967A in the next depth sculpturing region 966B. Seventh, depth sculpturing system 900 presents, via the image display 180A-B, 1080, the next depth sculptured image 967B.

In one example, the user input device 991, 1091 includes a touch sensor including an input surface and a sensor array that is coupled to the input surface to receive at least one finger contact inputted from a user. User input device 991, 1091 further includes a sensing circuit integrated into or connected to the touch sensor and connected to the processor 932, 1030. The sensing circuit is configured to measure voltage to track the at least one finger contact on the input surface. The function of receiving, via the user input device 991, 1091, the two-dimensional input selection 962 from the user includes receiving, on the input surface of the touch sensor, the at least one finger contact inputted from the user. The function of tracking, via the user input device 991, 1091, motion of the two-dimensional input selection 962 from the initial touch point to the final touch point includes tracking, via the sensing circuit, drag from the at least one finger contact on the input surface from the initial touch point to the final touch point on the input surface of the touch sensor.

A touch based user input device 991 can be integrated into the eyewear device 100. As noted above, eyewear device 100 includes a chunk 110A-B integrated into or connected to the frame 105 on the lateral side 170A-B of the eyewear device 100. The frame 105, the temple 125A-B, or the chunk 110A-B includes a circuit board that includes the touch sensor. The circuit board includes a flexible printed circuit board. The touch sensor is disposed on the flexible printed circuit board. The sensor array is a capacitive array or a resistive array. The capacitive array or the resistive array includes a grid that forms a two-dimensional rectangular coordinate system to track X and Y axes location coordinates.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays of optical assembly 180A-B as described in FIGS. 2B-C (e.g., a display such as a liquid crystal display (LCD), a plasma display panel (PDP), a light emitting diode (LED) display, a projector, or a waveguide). The image displays of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

FIG. 10 is a high-level functional block diagram of an example of a mobile device 990 that communicates via the depth sculpturing system 900 of FIG. 9. Mobile device 990 includes a user input device 1091 to receive a two-dimensional input selection to apply to an initial depth image 961A to generate a depth sculptured image 967A.

Mobile device 990 includes a flash memory 1040A which includes depth sculpturing programming 945 to perform all or a subset of the functions described herein for depth sculpturing, in which a two-dimensional input selection from a user is applied to an initial depth image 961A to generate a depth sculptured image 967A. As shown, memory 1040A further includes a left raw image 858A captured by left visible light camera 114A, a right raw image 858B captured by right visible light camera 114B, and an infrared image 859 captured by infrared camera 220 of the depth sensor 213. Mobile device 1090 can include a depth-capturing camera 1070 that comprises at least two visible light cameras (first and second visible light cameras with overlapping fields of view) or at least on visible light camera and a depth sensor with substantially overlapping fields of view like the eyewear device 100. When the mobile device 990 includes components like the eyewear device 100, such as the depth-capturing camera, the left raw image 858A, the right raw image 858B, and the infrared image 859 can be captured via the depth-capturing camera 1070 of the mobile device 990.

Memory 1040A further includes multiple depth images 961A-N, including initial depth image 961A, which are generated, via the depth-capturing camera of the eyewear device 100 or via the depth-capturing camera 1070 of the mobile device 990 itself. A flowchart outlining functions which can be implemented in the depth sculpturing programming 945 is shown in FIG. 11. Memory 1040A further includes a two-dimensional input selection 962, such as an initial touch point and a final touch point received by the user input device 1091. Memory 1040A further includes an initial ray 963, a final ray 964, a rotation matrix 965, a depth sculpturing region 966, an affinity matrix 968, left and right rectified images 969A-B (e.g., to remove vignetting towards the end of the lens), and image disparity 970, all of which are generated during image processing of the initial image 957A-N, depth images 961A-N (e.g., initial depth image 961A) to generate respective depth sculptured images 967A-N (e.g., depth sculptured image 967A).

As shown, the mobile device 990 includes an image display 1080, an image display driver 1090 to control the image display, and a user input device 1091 similar to the eyewear device 100. In the example of FIG. 10, the image display 1080 and user input device 1091 are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides block diagram illustrations of the example mobile device 990 having a touch screen display for displaying content and receiving user input as (or as part of) the user interface.

The activities that are the focus of discussions here typically involve data communications related to applying a two-dimensional input selection received via the user input device 1091 from a user to the displayed initial depth image 961A to generate a depth sculptured image 967A in the portable eyewear device 100 or the mobile device 990. As shown in FIG. 10, the mobile device 990 includes at least one digital transceiver (XCVR) 1010, shown as WWAN XCVRs, for digital wireless communications via a wide area wireless mobile communication network. The mobile device 990 also includes additional digital or analog transceivers, such as short range XCVRs 1020 for short-range network communication, such as via NFC, VLC, DECT, ZigBee, Bluetooth™, or WiFi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 990, the mobile device 990 can include a global positioning system (GPS) receiver. Alternatively, or additionally the mobile device 990 can utilize either or both the short range XCVRs 1020 and WWAN XCVRs 1010 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 1010, 1020.

The transceivers 1010, 1020 (network communication interface) conforms to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 990 for depth sculpturing.

Several of these types of communications through the transceivers 1010, 1020 and a network, as discussed previously, relate to protocols and procedures in support of communications with the eyewear device 100 or the server system 998 for depth sculpturing, such as transmitting left raw image 858A, right raw image 858B, infrared image 859, depth images 961A-N, and depth sculptured images 967A-N. Such communications, for example, may transport packet data via the short range XCVRs 1020 over the wireless connections 925 and 937 to and from the eyewear device 100 as shown in FIG. 9. Such communications, for example, may also transport data utilizing IP packet data transport via the WWAN XCVRs 1010 over the network (e.g., Internet) 995 shown in FIG. 9. Both WWAN XCVRs 1010 and short range XCVRs 1020 connect through radio frequency (RF) send-and-receive amplifiers (not shown) to an associated antenna (not shown).

The mobile device 990 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1030 or processor hardware in smartphone, laptop computer, and tablet.

The microprocessor 1030 serves as a programmable host controller for the mobile device 990 by configuring the mobile device 990 to perform various operations, for example, in accordance with instructions or programming executable by processor 1030. For example, such operations may include various general operations of the mobile device, as well as operations related to the depth sculpturing programming 945 and communications with the eyewear device 100 and server system 998. Although a processor may be configured by use of hardwired logic, typical processors in mobile devices are general processing circuits configured by execution of programming.

The mobile device 990 includes a memory or storage device system, for storing data and programming. In the example, the memory system may include a flash memory 1040A and a random access memory (RAM) 1040B. The RAM 1040B serves as short term storage for instructions and data being handled by the processor 1030, e.g. as a working data processing memory. The flash memory 1040A typically provides longer term storage.

Hence, in the example of mobile device 990, the flash memory 1040A is used to store programming or instructions for execution by the processor 1030. Depending on the type of device, the mobile device 990 stores and runs a mobile operating system through which specific applications, including depth sculpturing programming 945, are executed. Applications, such as the depth sculpturing programming 945, may be a native application, a hybrid application, or a web application (e.g., a dynamic web page executed by a web browser) that runs on mobile device 990 to generate depth sculptured images 967A-N from depth images 961A-N based on the received two-dimensional input selection 962. Examples of mobile operating systems include Google Android, Apple iOS (I-Phone or iPad devices), Windows Mobile, Amazon Fire OS, RIM BlackBerry operating system, or the like.

It will be understood that the mobile device 990 is just one type of host computer in the depth sculpturing system 900 and that other arrangements may be utilized. For example, a server system 998, such as that shown in FIG. 9, may depth sculpture the initial depth image 961A after generation of the initial depth image 961A, via the depth-capturing camera of the eyewear device 100.

FIG. 11 is a flowchart of a method with steps that can be implemented in the depth sculpturing system 900 to apply a two-dimensional input selection 962 from a user to an initial depth image 961A to generate a depth sculptured image 967B. Because the blocks of FIG. 11 were already explained in detail previously, repetition is avoided here.

Figure 12:
FIGS. 12-13 illustrate an example of a presented initial image of an indoor three-dimensional scene with various object features of a human object and a first two-dimensional input selection of the initial depth image.
Figure 13:
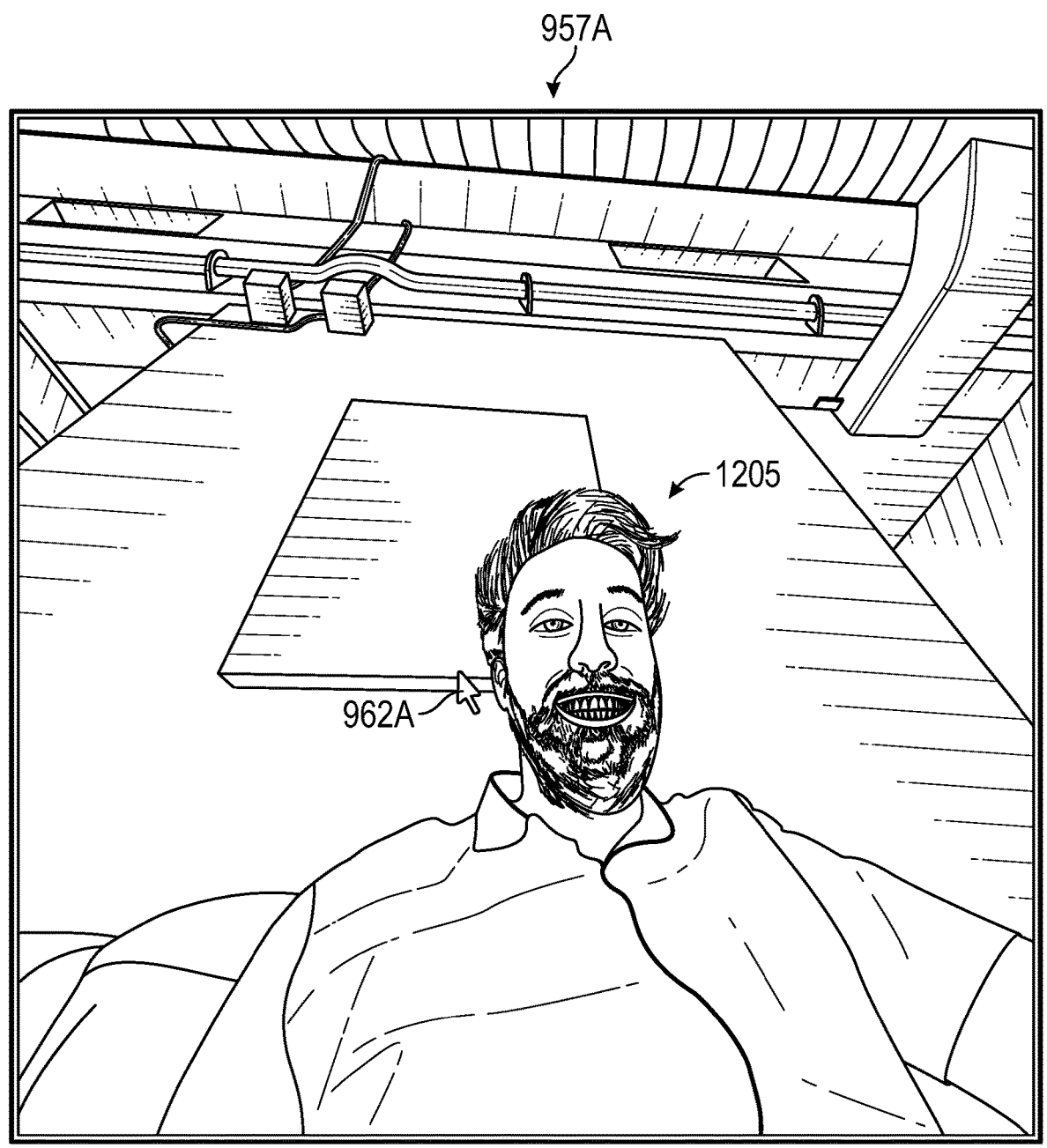

FIGS. 12-13 illustrate an example of a presented initial image 957A of an indoor three-dimensional scene 715 with various object features (e.g., human head, cheeks, forehead, nose, hair, teeth, mouth, etc.) of a human object 1205 and a first two-dimensional input selection 962A of the initial depth image 961A. In FIG. 12, the initial touch point of the first two-dimensional input selection 962A is a mouse cursor selection on the right cheek object feature of the human object 1205. In FIG. 13, the final touch point of the first two-dimensional input selection 962A is a mouse cursor selection on free space in the room away from the right check.

Figure 14:
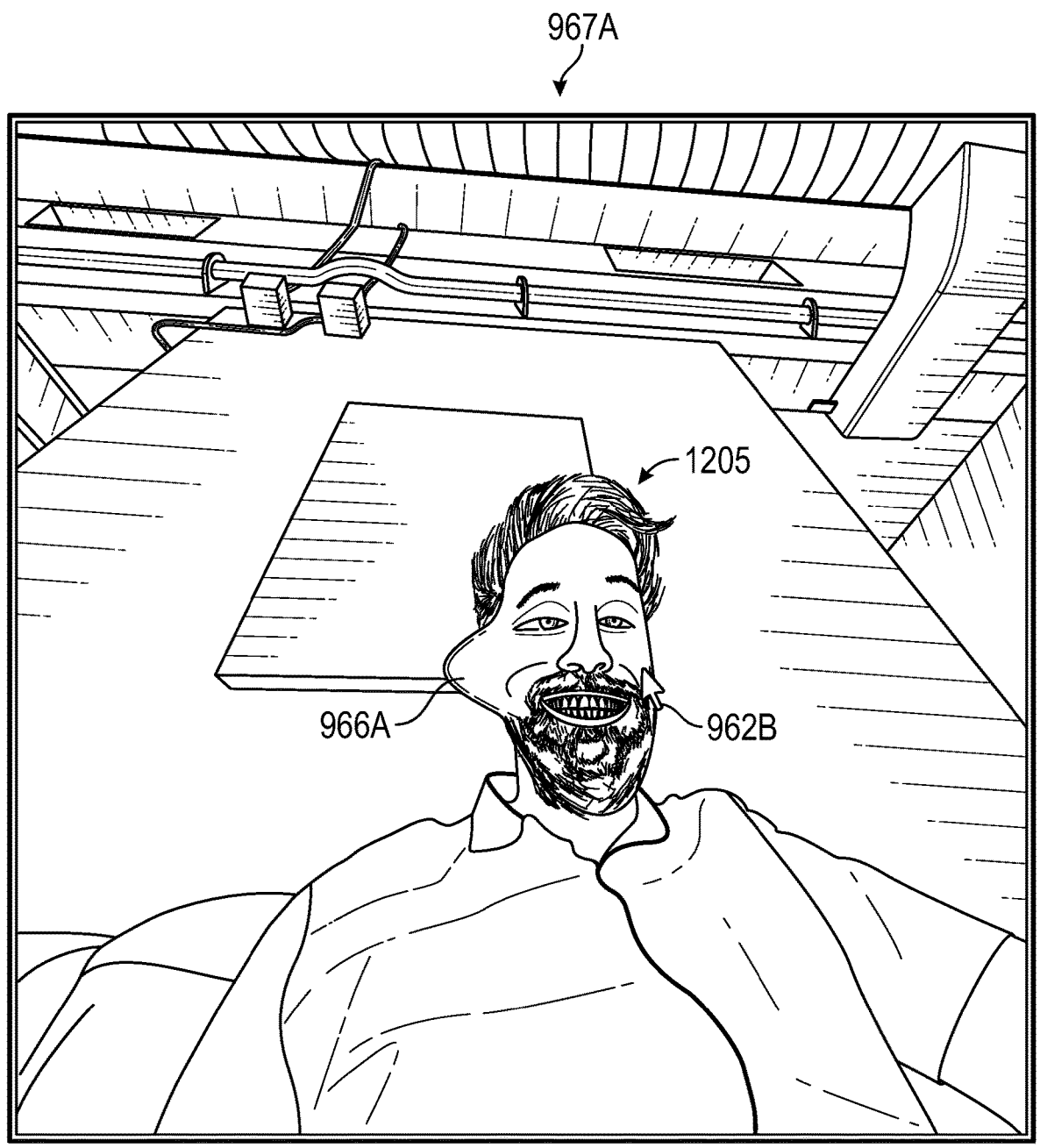
FIGS. 14-15 illustrate an example of a first generated depth sculptured image that rotates the initial depth image of FIGS. 12-13 of the human object based on the first two-dimensional selection to depth sculpture the right cheek object feature of the human object.
Figure 15:

FIGS. 14-15 illustrate an example of a first generated depth sculptured image 967A that rotates the initial depth image 961A of FIGS. 12-13 of the human object 1205 based on the first two-dimensional selection 962A to depth sculpture the right cheek object feature of the human object 1205. As shown in FIG. 14, the right cheek object feature is within the depth sculpturing region 966A and the right cheek object feature is extended outwards to bulge out within the depth sculpturing region 966A, which is bounded by the final touch point and the initial touch point of the first two-dimensional input selection 962A. In FIG. 14, the next initial touch point 962B of a next (second) two-dimensional input selection 962B is a mouse cursor selection on the left cheek object feature of the human object 1205. In FIG. 15, the final touch point of the next (second) two-dimensional input selection 962B is a mouse cursor selection on free space in the room away from the left cheek.

Figure 16:
FIGS. 16-17 illustrate an example of a second generated depth sculptured image that rotates the first depth sculptured image of the human object based on a next (second) two-dimensional selection to depth sculpture the left cheek object feature of the human object.
Figure 17:

FIGS. 16-17 illustrate an example of a second generated depth sculptured image 967B that rotates the first depth sculptured image 967A of FIGS. 14-15 of the human object 1205 based on the next (second) two-dimensional selection 962B to depth sculpture the left cheek object feature of the human object 1205. As shown in FIG. 16, the left cheek object feature is within the depth sculpturing region 966B and the left cheek object feature is extended outwards to bulge out within the depth sculpturing region 966B, which is bounded by the final touch point and the initial touch point of the next (second) two-dimensional input selection 962B. In FIG. 16, the next initial touch point 962C of another (third) next two-dimensional input selection 962C is a mouse cursor selection on the left forehead object feature of the human object 1205. In FIG. 17, the final touch point of the other next (third) two-dimensional input selection 962C is a mouse cursor selection on a hair object feature of the human object 1205.

Figure 18:
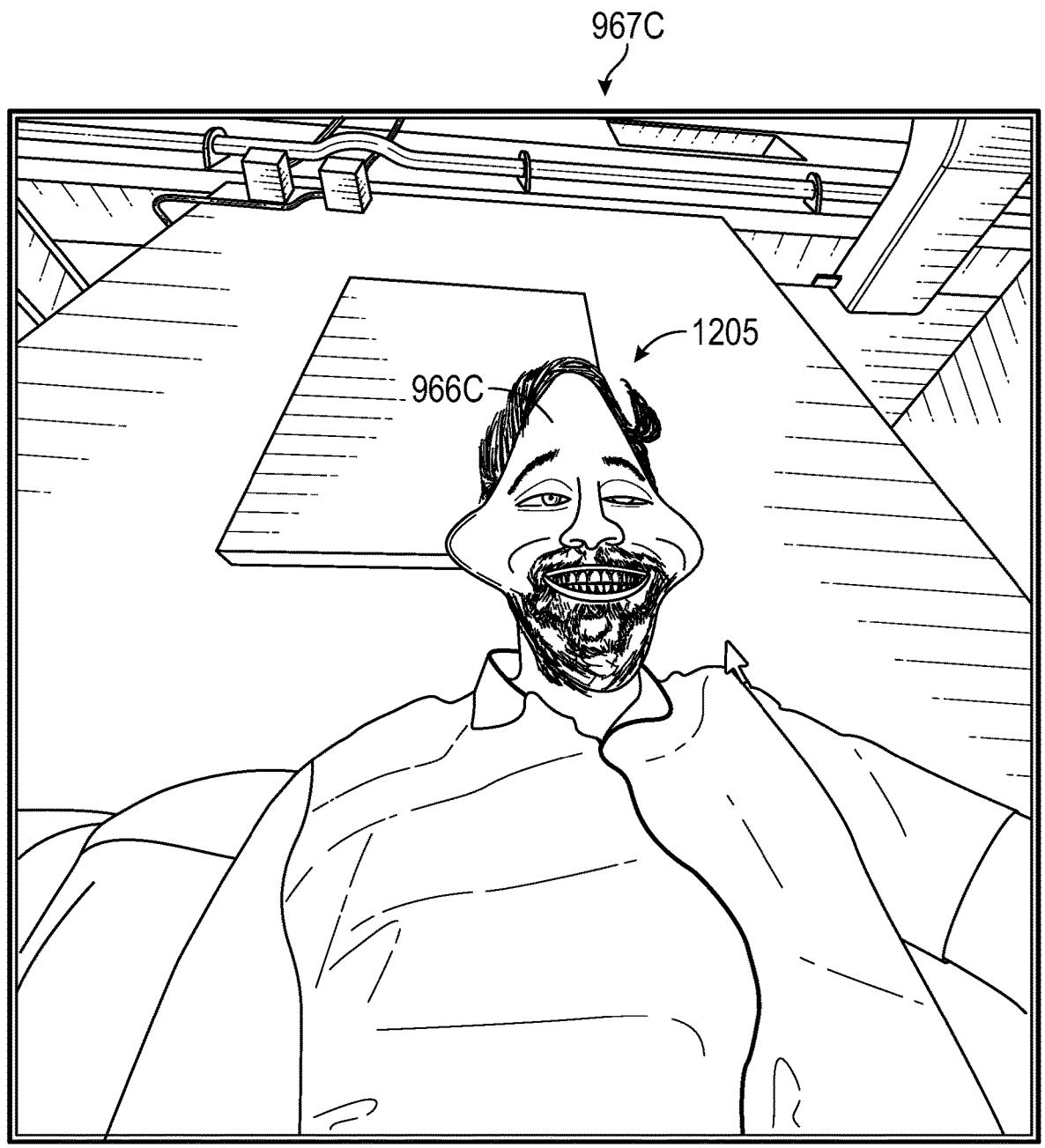
FIG. 18 illustrates an example of a third generated depth sculptured image that rotates the second depth sculptured image of FIGS. 16-17 of the human object based on another next (third) two-dimensional selection to depth sculpture the forehead object feature of the human object.
Figure 19:
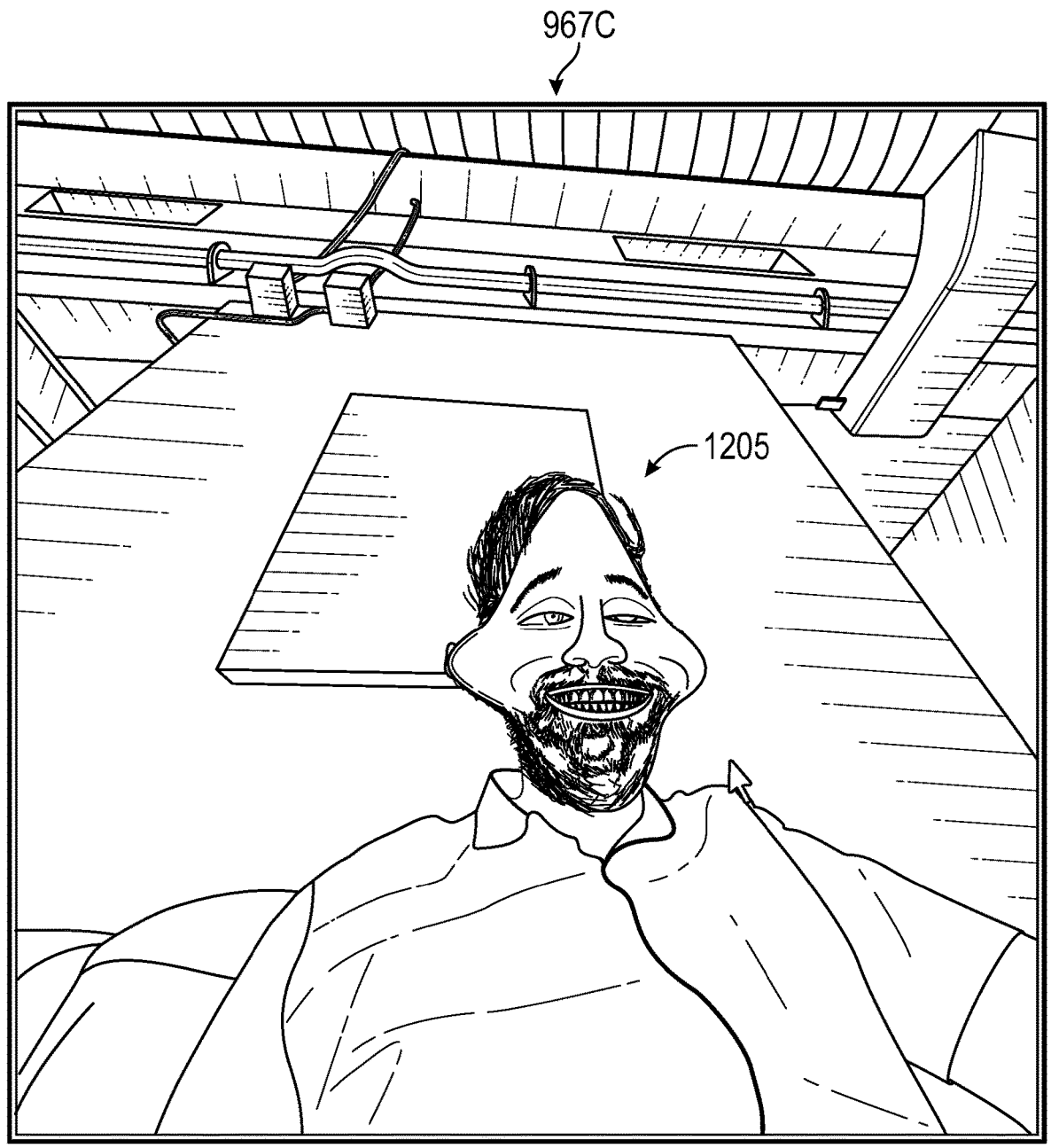
FIG. 19 illustrates a right rotation of the third generated depth sculptured image of FIG. 18 to demonstrate the depth of the three-dimensional model of the depth images and the depth sculptured images.
Figure 20:
FIG. 20 illustrates a left rotation of the third generated depth sculptured image of FIG. 18 to demonstrate the depth of the three-dimensional model of the depth images and the depth sculptured images.

FIG. 18 illustrates an example of a third generated depth sculptured image 967C that rotates the second depth sculptured image 967B of FIGS. 16-17 of the human object 1205 based on the other next (third) two-dimensional selection 962C to depth sculpture the forehead object feature of the human object 1205. As shown in FIG. 18, the forehead object feature is within the depth sculpturing region 966C and the forehead object feature is extended outwards to bulge out within the depth sculpturing region 966C, which is bounded by the final touch point and the initial touch point of the next (second) two-dimensional input selection 962B. FIG. 19 illustrates a right rotation of the third generated depth sculptured image 967C of FIG. 18 to demonstrate the depth (Z axis) of the three-dimensional model of the depth images 961A-N and the depth sculptured images 967A-N. FIG. 20 illustrates a left rotation of the third generated depth sculptured image 967C of FIG. 18 to further demonstrate the depth (Z axis) of the three-dimensional model of the depth images 961A-N and the depth sculptured images 967A-N.

Any of the depth sculpturing functionality described herein for the eyewear device 100, mobile device 990, and server system 998 can be embodied in one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A depth sculpturing system comprising:
    an eyewear device including:
        a frame including a bridge;
        a temple connected to a lateral side of the frame; and
        a depth-capturing camera, where in the depth-capturing camera includes: (i) at least two visible light cameras with overlapping fields of view; or (ii) a least one visible light camera and a depth sensor;
    an image display for presenting an initial image, wherein the initial image is a raw image or a processed raw image that is two-dimensional;
    an image display driver coupled to the image display to control the image display to present the initial image;
    a user input device to receive a two-dimensional input selection from a user;
    a memory;
    a processor coupled to the depth-capturing camera, the image display driver, the user input device, and the memory; and
    programming in the memory, wherein execution of the programming by the processor configures the depth sculpturing system to perform functions, including functions to:
        generate, via the depth-capturing camera, an initial depth image corresponding to the initial image, wherein:
            the initial depth image is formed of a matrix of vertices, each vertex representing a pixel in a three-dimensional scene;
            each vertex has a position attribute; and
            the position attribute of each vertex is based on a three-dimensional location coordinate system and includes an X location coordinate on an X axis for horizontal position, a Y location coordinate on a Y axis for vertical position, and a Z location coordinate on a Z axis for depth;
        present, via the image display, the initial image;
        receive, via the user input device, the two-dimensional input selection of the presented initial image from the user;
        track, via the user input device, motion of the two-dimensional input selection from an initial touch point to a final touch point of the presented initial image;
        compute an initial ray that is a projection from an origin vertex of the three-dimensional location coordinate system to an initial vertex corresponding to the initial touch point of the presented initial image, wherein the origin vertex corresponds to the depth-capturing camera;
        compute a final ray that is the projection from the origin vertex to a final vertex corresponding to the final touch point of the presented initial image;
        determine a rotation matrix between the initial ray and the final ray that describes rotation from the initial ray to the final ray to derive a depth sculpturing region;
        generate a depth sculptured image by applying the rotation matrix to the position attribute of the vertices of the initial depth image in the depth sculpturing region; and
        present, via the image display, the depth sculptured image.

2. The depth sculpturing system of claim 1, wherein each vertex further includes one or more of a color attribute, a texture attribute, or a reflectance attribute.

3. The depth sculpturing system of claim 1, wherein:
    execution of the programming by the processor further configures the depth sculpturing system to compute an affinity matrix for the vertices of the initial depth image around the initial vertex and the final vertex that determines an influence weight of the rotation matrix on each of the vertices; and
    the function of generating the depth sculptured image by applying the rotation matrix to the position attribute of the vertices of the initial depth image in the depth sculpturing region is based on the computed affinity matrix.

4. The depth sculpturing system of claim 1, wherein:
    the depth-capturing camera includes the at least two visible light cameras comprised of a left visible light camera with a left field of view and a right visible light camera with a right field of view;
    the left field of view and the right field of view are overlapping; and
    the function of generating, via the depth-capturing camera, the initial depth image includes:
        capturing, via the left visible light camera, a left raw image that includes a left matrix of pixels;
        capturing, via the right visible light camera, a right raw image that includes a right matrix of pixels;
        creating a left rectified image from the left raw image and a right rectified image from the right raw image that align the left and right raw images and remove distortion from a respective lens of each of the left and right visible light cameras;

extract an image disparity by correlating pixels in the left rectified image with the right rectified image to calculate a disparity for each of the correlated pixels; and calculating the Z location coordinate of vertices of the initial depth image based on at least the extracted image disparity for each of the correlated pixels.

5. The depth sculpturing system of claim 1, wherein:

the depth-capturing camera includes the at least one visible light camera and the depth sensor;

the at least one visible light camera and the depth sensor have a substantially overlapping field of view;

the depth sensor includes an infrared emitter and an infrared camera, wherein:

the infrared emitter connected to the frame or the temple to emit a pattern of infrared light; and the infrared camera connected to the frame or the temple to capture reflection variations in the emitted pattern of infrared light; and the function of generating, via the depth-capturing camera, the initial depth image includes:

capturing, via the at least one visible light camera, a raw image;

emitting, via the infrared emitter, a pattern of infrared light on a plurality of objects or object features located in a scene that are reached by the emitted infrared light;

capturing, via the infrared camera, an infrared image of reflection variations of the emitted pattern of infrared light on the plurality of objects or object features;

computing a respective depth from the depth-capturing camera to the plurality of objects or object features, based on the infrared image of reflection variations;

correlating objects or object features in the infrared image of reflection variations with the raw image; and calculating the Z location coordinate of vertices of the initial depth image based on, at least, the computed respective depth.

6. The depth sculpturing system of claim 1, wherein:

the function of generating the depth sculptured image by applying the rotation matrix to the position attribute of the vertices of the initial depth image includes:

multiplying each vertex of the initial depth image by the rotation matrix to obtain a new X location coordinate, a new Y location coordinate, and a new Z location coordinate on the three-dimensional location coordinate system.

7. The depth sculpturing system of claim 1, wherein:

the depth sculptured image is one of a sequence of depth sculptured images which are iteratively generated in succession; and wherein execution of the programming by the processor further configures the depth sculpturing system to iteratively perform functions to generate each of the sequence of depth sculptured images, including functions to:

in response to presenting, via the image display, the depth sculptured image;

receive, via the user input device, a next two-dimensional input selection of the depth sculptured image from the user;

track, via the user input device, motion of the next two-dimensional input selection from a next initial touch point to a next final touch point of the presented depth sculptured image;

compute a next initial ray that is the projection from the origin vertex of the three-dimensional location coordinate system to a next initial vertex corresponding to the next initial touch point on the depth sculptured image;

compute a next final ray that is the projection from the origin vertex of the to a next final vertex corresponding to the next final touch point of the presented depth sculptured image;

determine a next rotation matrix between the next initial ray and the next final ray that describes rotation from the next initial ray to the next final ray of the presented depth sculptured image to derive a next depth sculpturing region;

generate a next depth sculptured image by applying the next rotation matrix to the position attribute of the vertices of the depth sculptured image in the next depth sculpturing region; and present, via the image display, the next depth sculptured image.

8. The depth sculpturing system of claim 1, wherein:

the processor comprises a first processor and a second processor;

the memory comprises a first memory and a second memory;

the eyewear device includes:

a first network communication interface for communication over a network;

the first processor coupled to the first network communication interface;

the first memory accessible to the first processor; and programming in the first memory, wherein execution of the programming by the first processor configures the eyewear device to perform the function to generate, via the depth-capturing camera, the initial depth image corresponding to the initial image; and the depth sculpturing system further comprises a host computer coupled to the eyewear device over the network, the host computer including:

a second network communication interface for communication over the network;

the second processor coupled to the second network communication interface;

the second memory accessible to the second processor; and programming in the second memory, wherein execution of the programming by the second processor configures the host computer to perform the functions to:

receive, via the second network communication interface, the initial depth image over the network from the eyewear device;

present, via the image display, the initial image;

receive, via the user input device, the two-dimensional input selection from the user;

track, via the user input device, motion of the two-dimensional input selection from the initial touch point to the final touch point;

compute the initial ray;

compute the final ray;

determine the rotation matrix between the initial ray and the final ray that describes rotation between the initial ray and the final ray;

generate the depth sculptured image by applying the rotation matrix to the position attribute of the vertices of the initial depth image; and present, via the image display, the depth sculptured image.

9. The depth sculpturing system of claim 8, wherein:

the host computer is a mobile device;

the network is a wireless short-range network or a wireless local area network; and the user input device includes a touch screen or a computer mouse.

10. The depth sculpturing system of claim 1, wherein:

the user input device includes:

a touch sensor including an input surface and a sensor array that is coupled to the input surface to receive at least one finger contact inputted from a user; and a sensing circuit integrated into or connected to the touch sensor and connected to the processor, the sensing circuit configured to measure voltage to track the at least one finger contact on the input surface;

the function of receiving, via the user input device, the two-dimensional input selection from the user includes receiving, on the input surface of the touch sensor, the at least one finger contact inputted from the user; and the function of tracking, via the user input device, motion of the two-dimensional input selection from the initial touch point to the final touch point includes tracking, via the sensing circuit, drag from the at least one finger contact on the input surface from the initial touch point to the final touch point on the input surface of the touch sensor.

11. The depth sculpturing system of claim 10, further comprising:

a chunk integrated into or connected to the frame on the lateral side of the eyewear device; and wherein:

the frame, the temple, or the chunk includes a circuit board that includes the touch sensor;

the circuit board includes a flexible printed circuit board;

the touch sensor is disposed on the flexible printed circuit board;

the sensor array is a capacitive array or a resistive array; and the capacitive array or the resistive array includes a grid that forms a two-dimensional rectangular coordinate system to track X and Y axes location coordinates.

12. A method comprising steps of:

generating, via a depth-capturing camera, an initial depth image corresponding to an initial image, wherein:

the initial depth image is formed of a matrix of vertices, each vertex representing a pixel in a three-dimensional scene;

each vertex has a position attribute; and the position attribute of each vertex is based on a three-dimensional location coordinate system and includes an X location coordinate on an X axis for horizontal position, a Y location coordinate on a Y axis for vertical position, and a Z location coordinate on a Z axis for depth;

receiving, via a user input device, a two-dimensional input selection of the initial image from a user;

tracking, via the user input device, motion of the two-dimensional input selection from an initial touch point to a final touch point of the initial image;

computing an initial ray that is a projection from an origin vertex of the three-dimensional location coordinate system to an initial vertex corresponding to the initial touch point of the initial image, wherein the origin vertex corresponds to the depth-capturing camera;

computing a final ray that is the projection from the origin vertex to a final vertex corresponding to the final touch point of the initial image;

determining a rotation matrix between the initial ray and the final ray that describes rotation from the initial ray to the final ray to derive a depth sculpturing region;

generating a depth sculptured image by applying the rotation matrix to the position attribute of the vertices of the initial depth image in the depth sculpturing region; and presenting, via the image display, the depth sculptured image.

13. The method of claim 12, wherein each vertex further includes one or more of a color attribute, a texture attribute, or a reflectance attribute.

14. The method of claim 12, further comprising:

computing an affinity matrix for the vertices of the initial depth image around the initial point touch point and the final touch point that determines an influence weight of the rotation matrix on each of the vertices; and wherein the step of generating the depth sculptured image by applying the rotation matrix to the position attribute of the vertices of the initial depth image in the depth sculpturing region is based on the computed affinity matrix.

15. The method of claim 12, wherein:

the step of generating, via the depth-capturing camera, the initial depth image includes:

capturing, via the left visible light camera, a left raw image;

capturing, via the right visible light camera, a right raw image;

creating a left rectified image from the left raw image and a right rectified image from the right raw image that align the left and right raw images and remove distortion from a respective lens of each of the left and right visible light cameras;

extracting image disparity by correlating pixels in the left rectified image with the right rectified image; and calculating the Z location coordinate of vertices of the initial depth image based on at least the extracted image disparity.

16. The method of claim 12, wherein:

the step of generating, via the depth-capturing camera, an initial depth image includes:

capturing, via the at least one visible light camera, a raw image;

emitting, via the infrared emitter, a pattern of infrared light on a plurality of objects or object features located in a scene that are reached by the emitted infrared light;

capturing, via the infrared camera, an infrared image of reflection variations of the emitted pattern of infrared light on the plurality of objects or object features;

computing a respective depth from the depth-capturing camera to the plurality of objects or object features, based on the reflection variations;

correlating object in the image of reflection variations with the raw image; and calculating the Z location coordinate of vertices of the initial depth image based on, at least, the computed respective depth.

17. The method of claim 12, wherein:

the step of generating a depth sculptured image by applying the rotation matrix to the position attribute of the vertices of the initial depth image includes:
multiplying each vertex of the initial depth image by the rotation matrix to obtain a new X location coordinate, a new Y location coordinate, and a new Z location coordinate on the three-dimensional location coordinate system.

18. The method of claim 12, wherein:

the step of generating, via the depth-capturing camera, the initial depth image is implemented on an eyewear device; and the steps of presenting, via the image display, the initial image; receiving, via the user input device, the two-dimensional input selection from the user; tracking, via the user input device, motion of the two-dimensional input selection from an initial touch point to a final touch point; computing the initial ray; computing the final ray; determining the rotation matrix; generating the depth sculptured image; and presenting, via the image display, the depth sculptured image are implemented on a host computer.

19. The method of claim 12, wherein:

the host computer is a mobile device, tablet computer, or a laptop computer; and the user input device includes a touch screen or a computer mouse.

20. The method of claim 12, wherein:

the step of receiving, via the user input device, the two-dimensional input selection from the user includes receiving, on an input surface of a touch sensor, at least one finger contact inputted from the user; and the step of tracking, via the user input device, motion of the two-dimensional input selection from the initial touch point to the final touch point includes tracking, via a sensing circuit, drag from the at least one finger contact on the input surface from the initial touch point to the final touch point on the input surface of the touch sensor.

* * * * *